US007430669B2

(12) United States Patent
Osada

(10) Patent No.: US 7,430,669 B2
(45) Date of Patent: Sep. 30, 2008

(54) IMAGE FORMING APPARATUS, LAUNCHING METHOD OF PROGRAM IN THE APPARATUS, IMAGE FORMING SYSTEM, AND PROGRAM AND STORAGE MEDIUM THEREFOR

(75) Inventor: Mamoru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/837,649

(22) Filed: May 4, 2004

(65) Prior Publication Data
US 2004/0230842 A1     Nov. 18, 2004

(30) Foreign Application Priority Data
May 13, 2003     (JP)     ............... 2003-134741

(51) Int. Cl.
*G06F 9/00*     (2006.01)
(52) U.S. Cl. ....................... 713/187; 713/193
(58) Field of Classification Search ............... 713/167, 713/193, 187
See application file for complete search history.

(56) References Cited
U.S. PATENT DOCUMENTS 6,535,932 B1    3/2003   Endoh et al. ................. 710/7
6,636,903 B2   10/2003   Endoh et al. ................. 710/8
6,717,689 B1    4/2004   Endo et al. ................ 358/1.15
7,155,413 B2   12/2006   Nakai et al. ................. 705/51
2003/0214666 A1 11/2003  Osada ....................... 358/1.13
2004/0042030 A1  3/2004  Endoh et al. ............... 358/1.14

FOREIGN PATENT DOCUMENTS

| JP | 7-110857    | 4/1995  |
| JP | 2001-229018 | 8/2001  |
| JP | 2001-309099 | 11/2001 |
| JP | 2002-108475 | 4/2002  |

*Primary Examiner*—Thomas R Peeso
(74) *Attorney, Agent, or Firm*—Fitzpatrick, Cella, Harper & Scinto

(57) ABSTRACT

An image forming apparatus which is connected to an external device via a communication unit includes a launching program identification unit which stores launching program information for specifying a program module to be executed upon launching from a plurality of program modules for realizing a plurality of functions, and a program management unit which executes a program module corresponding to the launching program information when the image forming apparatus is activated, on the basis of the launching program information stored in the launching program identification unit. License information containing the identification information and launching program information of the apparatus is acquired from a PC via the communication unit. The launching program information stored in the launching program identification unit is updated on the basis of the acquired license information, thereby changing the program module to be executed upon activating the apparatus.

12 Claims, 28 Drawing Sheets

FIG. 6

| MODULE NO. 601 | MODULE NAME 602 | MODULE ID 603 | LAUNCHING FLAG 604 | MODULE 605 |
|---|---|---|---|---|
| 1 | PDL RENDERING MODULE (1) | c2b291f0-7e8b-11d6-a44a-0050004d0f31a | LAUNCHED | MODULE ENTITY |
| 2 | PDL RENDERING MODULE (2) | ef2c4400-7e8b-11d6-a44a-0050004d0f31a | NOT LAUNCHED | MODULE ENTITY |
| 3 | IMAGE COMPRESSION / DECOMPRESSION MODULE (1) | f1da5f30-7e8b-11d6-a44a-0050004d0f31a | LAUNCHED | MODULE ENTITY |
| 4 | FAX SCAN MODULE | 21b05fd0-7e8c-11d6-a44a-0050004d0f31a | NOT LAUNCHED | MODULE ENTITY |
| 5 | NETWORK COMMUNICATION MODULE (1) | 2236d850-7e8c-11d6-a44a-0050004d0f31a | LAUNCHED | MODULE ENTITY |
| 6 | NETWORK COMMUNICATION MODULE (2) | 22a7ec30-7e8c-11d6-a44a-0050004d0f31a | NOT LAUNCHED | MODULE ENTITY |

FIG. 8A

| MODULE ID 801 | LICENSE FLAG 802 | EXPIRATION DATE 803 | TOTAL PRINT COUNT 804 | TOTAL DOCUMENT COUNT 805 |
|---|---|---|---|---|
| c2b291f0-7e8b-11d6-a44a-005004d0f31a | 0x0000 | — | — | — |
| f1da5f30-7e8b-11d6-a44a-005004d0f31a | 0x2000 | — | — | 200000 |
| 2236d850-7e8c-11d6-a44a-005004d0f31a | 0x8000 | 2006/6/30 | — | — |

ABC12345678

FIG. 10

| | | |
|---|---|---|
| SERIAL NUMBER | ABC12345678 | ~1001 |
| MODULE ID | 21b05fd0-7e8c-11d6-a44a-005004d0f31a | ~1002 |
| LICENSE FLAG | 0xa000 | ~1003 |
| EXPIRATION DATE | 2099/12/31 | ~1004 |
| TOTAL PRINT COUNT | 0 | ~1005 |
| TOTAL DOCUMENT COUNT | 1000000 | ~1006 |

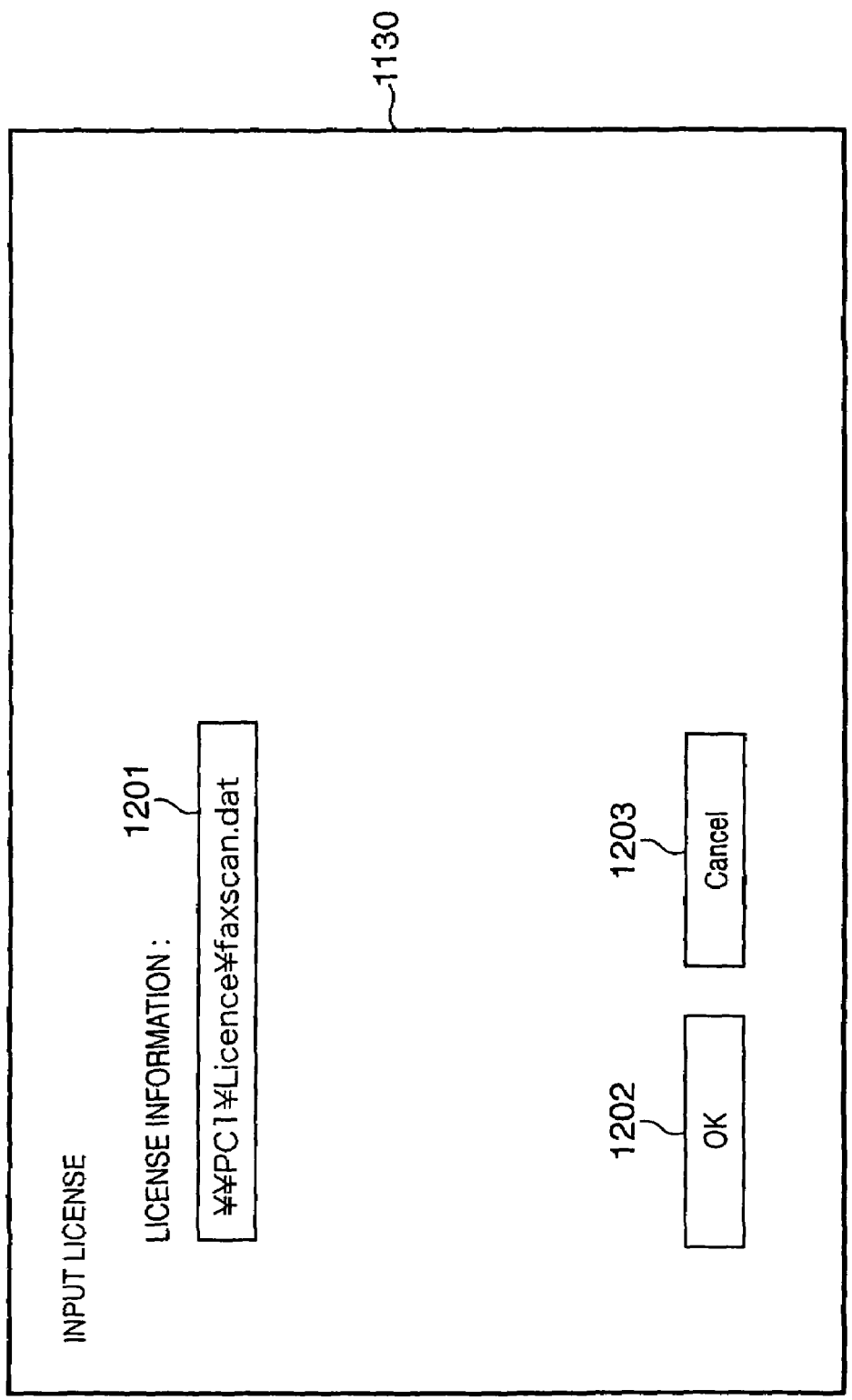

FIG. 13A

THE LICENSE IS INPUT CORRECTLY.

THE DESIGNATED LICENSE IS INVALID.

| MODULE NO. | MODULE NAME | MODULE ID | LAUNCHING FLAG | MODULE |
|---|---|---|---|---|
| 1 | PDL RENDERING MODULE (1) | c2b291f0-7e8b-11d6-a44a-005004d0f31a | LAUNCHED | MODULE ENTITY |
| 2 | PDL RENDERING MODULE (2) | ef2c4400-7e8b-11d6-a44a-005004d0f31a | NOT LAUNCHED | MODULE ENTITY |
| 3 | IMAGE COMPRESSION / DECOMPRESSION MODULE | f1da5f30-7e8b-11d6-a44a-005004d0f31a | LAUNCHED | MODULE ENTITY |
| 4 | FAX SCAN MODULE | 21b05fd0-7e8b-11d6-a44a-005004d0f31a | LAUNCHED | MODULE ENTITY |
| 5 | NETWORK COMMUNICATION MODULE (1) | 2236d850-7e8b-11d6-a44a-005004d0f31a | LAUNCHED | MODULE ENTITY |
| 6 | NETWORK COMMUNICATION MODULE (2) | 22a7ec30-7e8c-11d6-a44a-005004d0f31a | NOT LAUNCHED | MODULE ENTITY |

| MODULE ID | LICENSE FLAG | EXPIRATION DATE | TOTAL PRINT COUNT | TOTAL DOCUMENT COUNT |
|---|---|---|---|---|
| c2b291f0-7e8b-11d6-a44a-005004d0f31a | 0x0000 | — | — | — |
| f1da5f30-7e8b-11d6-a44a-005004d0f31a | 0x2000 | — | — | 200000 |
| 2236d850-7e8b-11d6-a44a-005004d0f31a | 0x8000 | 2006/6/30 | — | — |
| 21b05fd0-7e8c-11d6-a44a-005004d0f31a | 0xa000 | 2099/12/31 | — | 1000000 |

FIG. 18

| MODULE ID | TOTAL PRINT COUNT | TOTAL DOCUMENT COUNT | FAX TRANSMISSION PAGE COUNT |
|---|---|---|---|
| 1801 | 1802 | 1803 | 1804 |
| c2b291f0-7e8b-11d6-a44a-005004d0f31a | 54562 | 0 | 0 |
| ef2c4400-7e8b-11d6-a44a-005004d0f31a | 0 | 0 | 0 |
| f1daf30-7e8b-11d6-a44a-005004d0f31a | 0 | 658898 | 0 |
| 21b05fd0-7e8c-11d6-a44a-005004d0f31a | 0 | 0 | 0 |

| | | |
|---|---|---|
| SERIAL NUMBER | ABC12345678 | ~1001 |
| LICENSE IDENTIFICATION INFORMATION | fb96a7a0-60ef-11d7-a48b-005004d0f31a | ~2602 |
| MODULE ID | 21b05fd0-7e8c-11d6-a44a-005004d0f31a | ~1002 |
| LAUNCHING INFORMATION | LAUNCHING | ~2604 |
| EXECUTABLE COUNT | 5 | ~2605 |
| LICENSE FLAG | 0xa000 | ~1003 |
| EXPIRATION DATE | 2099/12/31 | ~1004 |
| TOTAL PRINT COUNT | 0 | ~1005 |
| TOTAL DOCUMENT COUNT | 1000000 | ~1006 |

FIG. 27

| 2701 | 2702 | 2703 |
|---|---|---|
| No. 1 | 8735aa40-60fa-11d7-a48b-005004d0f31a | 2 |
| No. 2 | | |

IMAGE FORMING APPARATUS, LAUNCHING METHOD OF PROGRAM IN THE APPARATUS, IMAGE FORMING SYSTEM, AND PROGRAM AND STORAGE MEDIUM THEREFOR

FIELD OF THE INVENTION

The present invention relates to an image forming apparatus which is connected to an external device via a communication unit, launching method of program in the image forming apparatus, an image forming system, a program therefor, and a storage medium which stores the program.

BACKGROUND OF THE INVENTION

There has conventionally been proposed an image forming system in which a plurality of PCs and an image forming apparatus such as an LBP (Laser Beam Printer) or multifunction apparatus are connected via a communication means such as a network. The image forming apparatus in the image forming system provides various functions, and these functions are generally graded in accordance with the cost or the like. For example, when a lineup of image forming apparatuses such as sister products is to be developed, only one basic program for controlling the operation of the apparatus is developed. A plurality of program modules which take on functions provided by the apparatus are installed in advance. Only program modules corresponding to the specifications of each apparatus are validated, providing functions corresponding to the product arrangement of the apparatus.

In some cases, a younger one of sister products is given options for achieving the same specifications as those of an elder sister product. The user who has purchased such product purchases an optional function and can use the new function. For a hardware optional function, when the hardware is mounted, the program module can be automatically validated by a mechanical or electrical identification means. For a purely software function or the like, the program module must be externally explicitly validated. As a validation means, a serviceman or the like conventionally connects an image forming apparatus to an apparatus dedicated to rewrite program identification information held by a launching program identification means, and rewrites the contents of the information. Alternatively, a program module is validated by inputting a password corresponding to the program module from the operation unit of the image forming apparatus, a PC connected to the image forming apparatus, or the like. In conventional program module validation, once a program module is validated, it permanently becomes valid.

This prior art poses the following problems.

More specifically, when a serviceman or the like uses a dedicated rewrite apparatus, as described above, the manufacture of the apparatus costs. The cost also rises because a serviceman or the like must go to a place where the apparatus is installed. The method of inputting a password suffers weak security because, if the password leaks, a user who cannot originally utilize the function can use the function. In the prior art, one rewrite apparatus or password is used for a given product, and rewrite cannot be done for each image forming apparatus, failing to take satisfactory measures against illegal use of the rewrite apparatus and leakage of a password. In the prior art, a program module which has been validated once can be permanently used, and may be illegally used for a long time.

SUMMARY OF THE INVENTION

The present invention has been made in consideration of the above situation, and has as its feature to allow easily changing a program module executed upon launching.

It is another feature of the present invention to add the use limitation condition of a validated program module and limit permanent use of the program module.

According to one aspect of the present invention, there is provided an image forming apparatus which is connected to an external device via a communication unit, comprising, a storage unit configured to store identification information for specifying the image forming apparatus; a program storage unit configured to store a plurality of program modules for realizing a plurality of functions of the image forming apparatus; a launching program identification unit configured to store launching program information for specifying a program module to be executed upon launching among the plurality of program modules stored in the program storage unit; a program management unit configured to execute a program module corresponding to the launching program information in a case where the image forming apparatus is activated on the basis of the launching program information stored in the launching program identification unit; an acquisition unit configured to acquire, from the external device via the communication unit, license information containing the identification information and count data for defining an executable count of the program module; and an updating unit configured to update the launching program information stored in the launching program identification unit, on the basis of the license information acquired by the acquisition unit, wherein launching of the program module corresponding to the launching program defined by the license information is prohibited, in a case where a count in which the program module has been executed is not less than the executable count.

According to one aspect of the present invention, there is provided a program launching control method in an image forming apparatus which is connected to an external device via a communication unit, comprising: a program launching step of launching a launching program module to be executed upon launching by specifying the launching program module from a plurality of program modules in accordance with launching program information; an acquisition step of acquiring, from the external device via the communication unit, license information containing launching program information for specifying identification information of the image forming apparatus, the launching program module and count data for defining an executable count of the program module; and an updating step of updating, on the basis of the license information acquired in the acquisition step, the launching program information for specifying the launching program module, wherein launching of the program module corresponding to the launching program defined by the license information is prohibited, in a case where a count in which the program module has been executed is not less than the executable count.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 6 depicts a table for explaining an example of management data of a launching program module according to the first embodiment;

FIG. 8A depicts a table for explaining management information managed by the license management unit according to the first embodiment;

FIG. 8B depicts a view showing an example of identification information;

FIG. 10 depicts a table for explaining an example of a license condition in the PC according to the first embodiment;

FIG. 12 depicts a view showing an example of a license information loading designation window in the operation unit of the image forming apparatus according to the first embodiment;

FIGS. 13A and 13B depict views each showing an example of a window which is displayed on the operation unit of the image forming apparatus according to the first embodiment and exhibits a process result upon loading license information;

FIG. 16 depicts a table showing an example of launching program management data after license information is acquired in the image forming apparatus according to the first embodiment;

FIG. 17 depicts a table showing an example of management data after license information is acquired in the image forming apparatus according to the first embodiment;

FIG. 18 depicts a table showing an example of data of a use resource counting table in the image forming apparatus according to the first embodiment;

FIG. 26 depicts a table showing an example of the contents of a license condition according to a fourth embodiment of the present invention;

FIG. 27 depicts a table for explaining a license identification information storage unit stored in the controller of an image forming apparatus according to the fourth embodiment.

DETAILED DESCRIPTION OF THE PREFERRED EMBODIMENTS

Preferred embodiments of the present invention will be described in detail below with reference to the accompanying drawings.

First Embodiment

Figure 1:
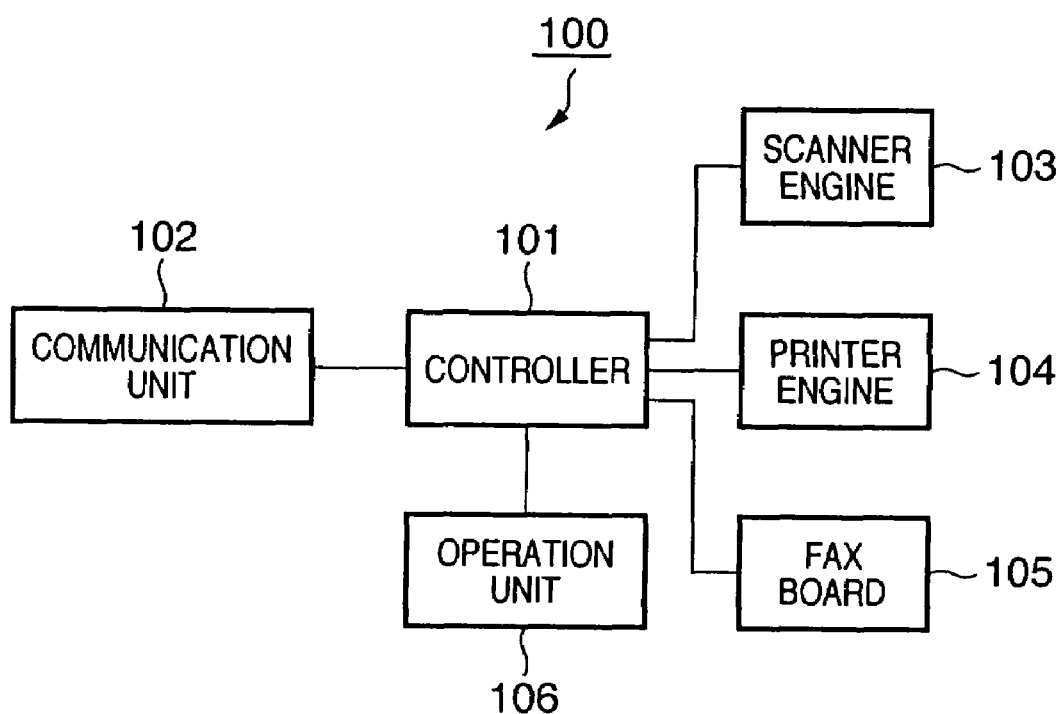
FIG. 1 is a block diagram showing the schematic functional arrangement of an image forming apparatus according to a first embodiment of the present invention.

FIG. 1 is a block diagram showing the whole arrangement of an image forming apparatus 100 according to the first embodiment of the present invention. The image forming apparatus will be exemplified as a multifunction apparatus which operates as a scanner, facsimile apparatus, and printer, but the present invention is not limited to this.

Figure 2:
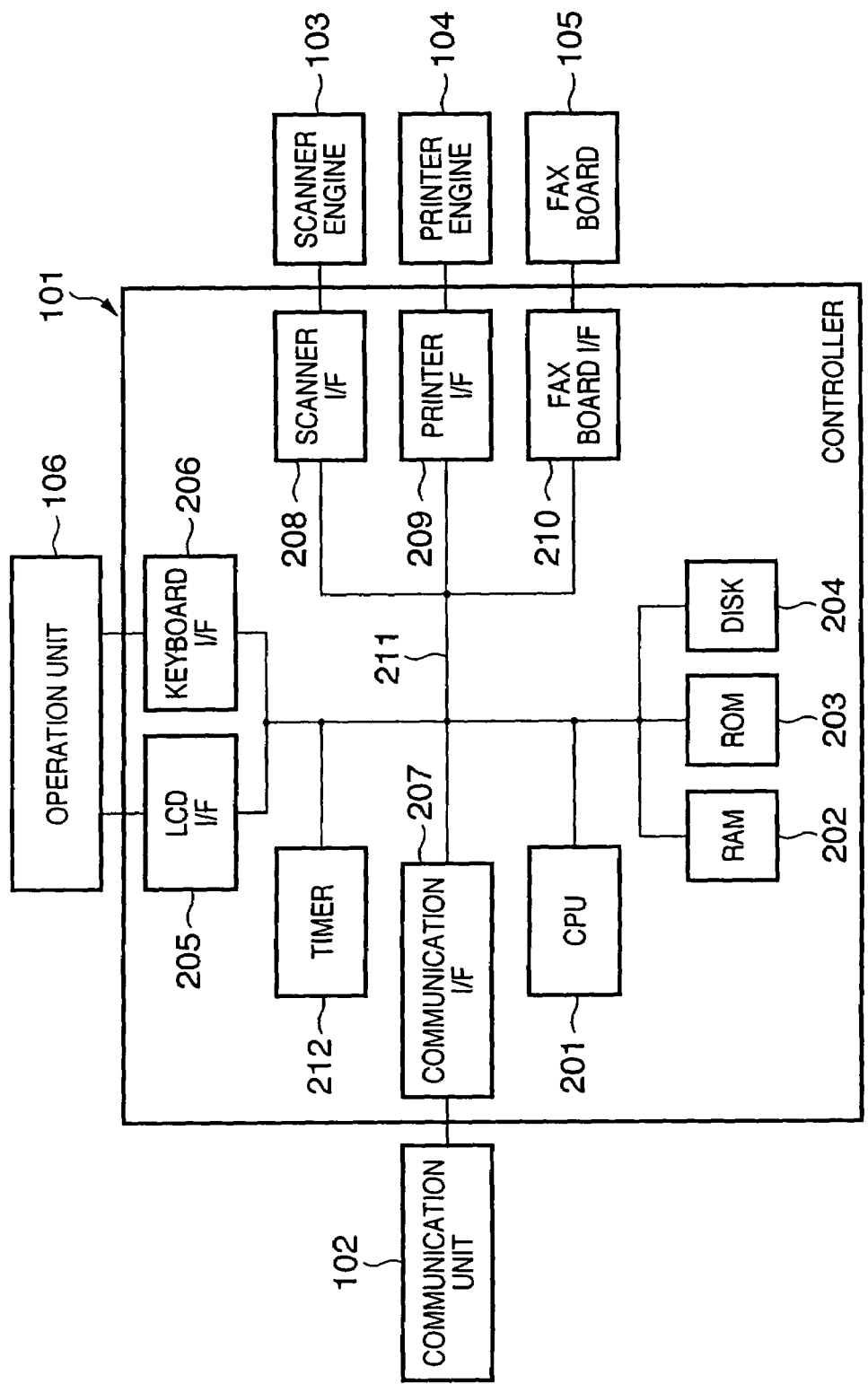
FIG. 2 is a block diagram mainly showing the arrangement of the controller of the image forming apparatus according to the first embodiment.

In FIG. 1, reference numeral 101 denotes a controller which controls the operation of the overall image forming apparatus 100 and has a hardware arrangement as shown in FIG. 2 (to be described later). Reference numeral 102 denotes a communication unit which exchanges various data with an external device such as a personal computer (PC). The communication unit 102 may have an Ethernet, IEEE 1284, or another communication function. The number of communication functions is not limited to one, and a plurality of communication functions may be adopted. Reference numeral 103 denotes a scanner engine which is controlled by the controller 101 and scans a document or the like to generate an image signal serving as an electrical signal. Reference numeral 104 denotes a printer engine which is used to actually print an image on a print sheet. The printer engine 104 may be, e.g., a laser beam printer, inkjet printer, or another printer. Reference numeral 105 denotes a FAX (facsimile) board which implements a FAX communication function such as communication control in exchanging an image signal. The operation of the FAX board 105 is controlled by the controller 101. Reference numeral 106 denotes an operation unit which comprises a display such as an LCD (Liquid Crystal Display: to be described later), a keyboard, various switches, and the like. The operation unit 106 has a function of displaying information sent from the controller 101 on a display 1130 (FIG. 11), and transmitting to the controller 101 an instruction input by the user using a keyboard, switch, or the like.

In the image forming apparatus with the above arrangement according to the first embodiment, the scanner engine 103 can be selected to issue a scan job such as document scanning. The printer engine 104 and scanner engine 103 can be selected to issue a copy job. The printer engine 104, scanner engine 103, and FAX board 105 can be selected to issue a FAX reception job and FAX transmission job.

FIG. 2 is a block diagram showing the schematic arrangement of the controller 101 according to the first embodiment. The same reference numerals as in FIG. 1 denote the same parts.

In FIG. 2, the controller 101 comprises a CPU (Central Processing Unit) 201, RAM (Random Access Memory) 202, ROM (Read Only Memory) 203, hard disk (DISK) 204, LCD interface (I/F) 205 for the display 1130 (FIG. 11), keyboard I/F 206, communication I/F 207, scanner I/F 208, printer I/F 209, FAX board I/F 210, and timer 212. These units are connected to each other via a system bus 211.

The CPU 201 executes various control operations by reading out a program stored in the ROM 203 and a control program stored in the disk 204 to the RAM 202 by a program management unit 501 (FIG. 5: to be described later) and executing the readout programs. The ROM 203 and disk 204 store attribute information representing a state and functions of jobs processed by the image forming apparatus and job data to be output, and the like. The CPU 201 displays information, messages, and the like on the display 1130 via the operation unit 106 and LCD I/F 205, and receives user instructions via the keyboard I/F 206. The CPU 201 communicates with an external device via the communication unit 102 and communication I/F 207. The LCD I/F 205 controls display on the operation unit 106. The keyboard I/F 206 receives signals from, e.g., the keyboard and switches of the operation unit 106. The communication I/F 207 controls an interface with the communication unit 102. The scanner I/F 208 controls an interface with the scanner engine 103. The printer I/F 209 controls an interface with the printer engine 104. The FAX board I/F 210 controls an interface with the FAX board 105.

Figure 3:
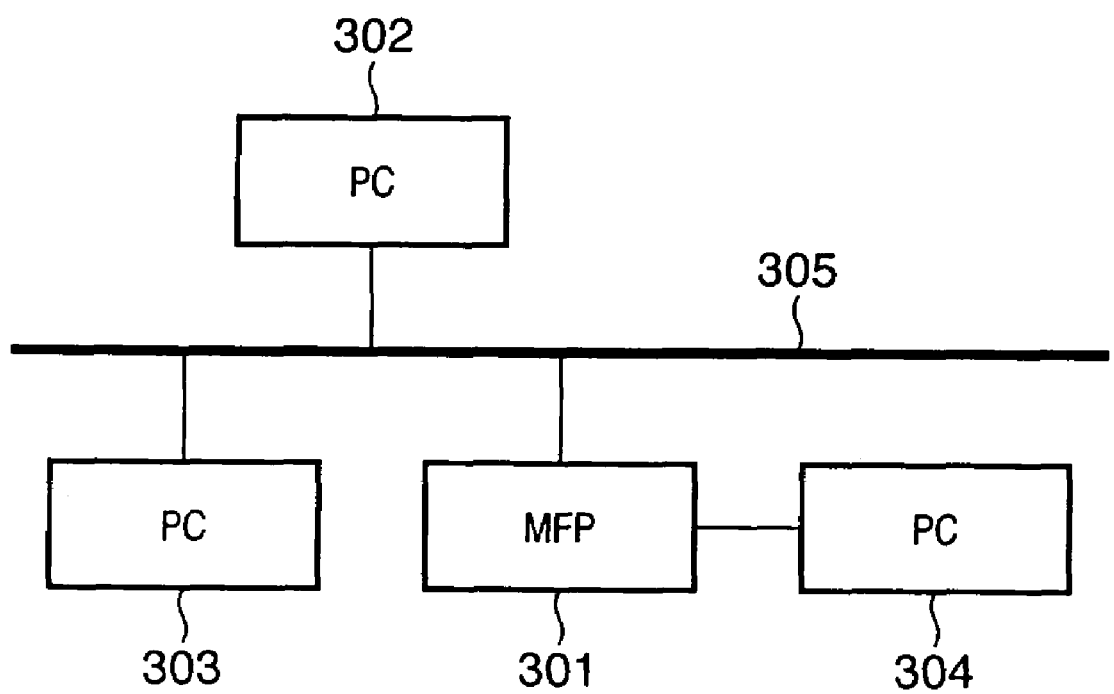
FIG. 3 is a block diagram showing the arrangement of a network system according to the first embodiment.

FIG. 3 is a block diagram showing an example of the arrangement of a network system connected to the image forming apparatus according to the first embodiment.

Figure 4:
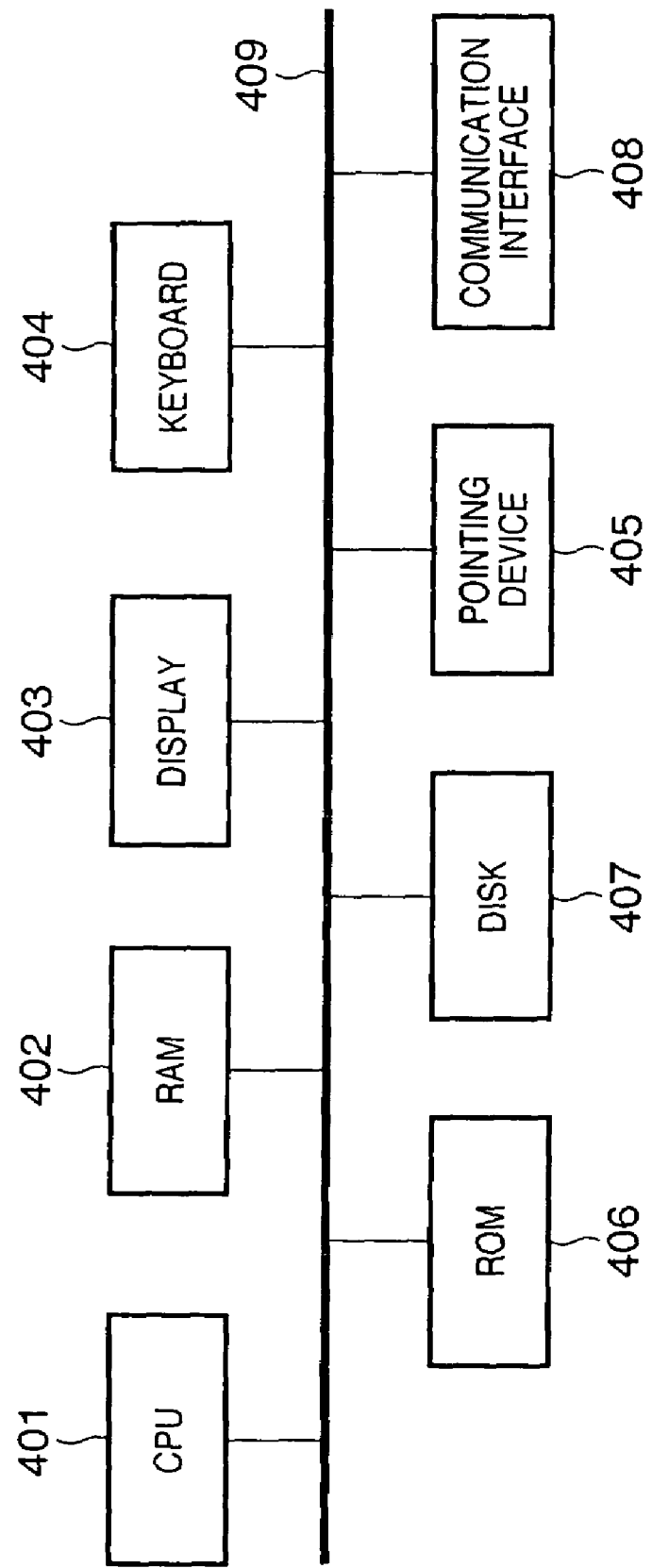
FIG. 4 is a block diagram for explaining the hardware arrangement of an information processing apparatus (PC) according to the first embodiment.

In FIG. 3, the image forming apparatus 100 according to the first embodiment is an MFP (Multi Function Peripheral: a multifunction apparatus having the functions of a scanner, printer, facsimile, and the like), and corresponds to the above-described image forming apparatus (as shown in FIGS. 1 and 2). Reference numerals 302 to 304 denote personal computers (PCs). The PCs 302 to 304 each have a hardware arrangement as shown in FIG. 4, and is connected to an MFP 301 via a network 305. A workstation, another image forming apparatus, or another device may be connected to the MFP 301 via the network 305.

FIG. 4 is a block diagram showing the hardware arrangement of each of the PCs 302 to 304 according to the first embodiment. These PCs assume to have the same hardware arrangement, but are not limited to the same arrangement as far as they are similar computer devices.

In FIG. 4, a CPU 401 controls the operation of the PC in accordance with a control program stored in a RAM 402. The RAM 402 stores a control program loaded from a hard disk (DISK) 407. In addition, the RAM 402 is used as a work area and temporarily saves various data when the CPU 401 operates. A display 403 is a monitor display, and may be a display such as a liquid crystal display. A keyboard 404 and a pointing device 405 such as a mouse are manipulated by the user to input various data, instructions, and the like. The hard disk (DISK) 407 stores an OS, various applications, and the like. In launching a program, the program is read out from the hard disk (DISK) 407, stored in the RAM 402, and executed. A ROM 406 stores a BIOS, boot program, and the like. A communication interface 408 executes data exchange with a communication line (not shown). A system bus 409 is an internal bus which connects these units.

Figure 5:
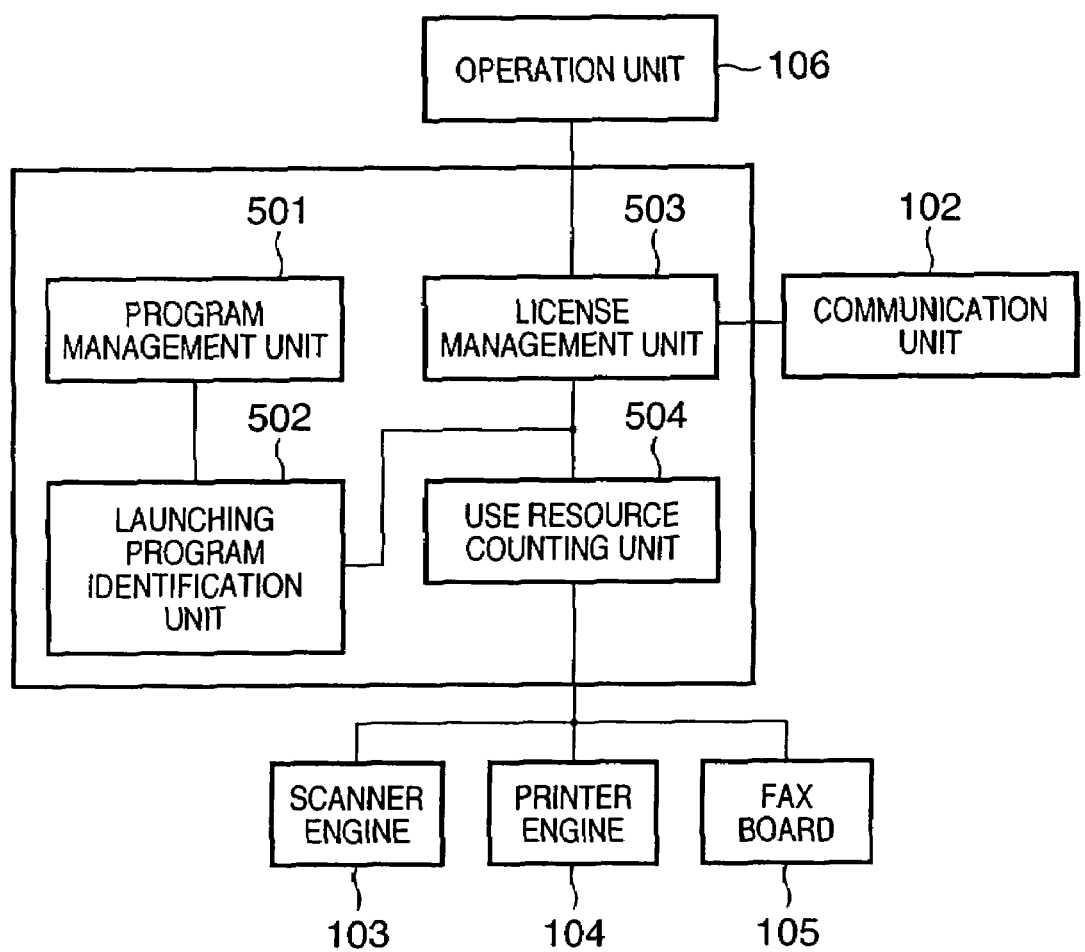
FIG. 5 is a block diagram for explaining the software arrangement of the controller according to the first embodiment.

FIG. 5 is a functional block diagram for explaining the functional arrangement of the controller 101 according to the first embodiment. Various functions are implemented by programs in the first embodiment, but the present invention is not limited to this.

The program management unit 501 is executed by the CPU 201 immediately after the controller 101 is activated. The program management unit 501 sequentially launches target program modules in accordance with information held by a launching program identification unit 502 (to be described next). The launching program identification unit 502 manages information on program modules to be launched. Reference numeral 503 denotes a license management unit which communicates with the operation unit 106 or communication unit 102, acquires designated license information, and registers a program module corresponding to the license information as a launching program. Reference numeral 504 denotes a use resource counting unit which counts resources used by the scanner engine 103, printer engine 104, and FAX board 105 for each program module.

FIG. 6 depicts a table for explaining launching program management data managed by the launching program identification unit 502 according to the first embodiment. In FIG. 6, each record manages information on one program module.

Reference numeral 601 denotes a module number field which adds a sequential number to a program module managed as launching program management data. Reference numeral 602 denotes a module name field which stores the name of each program module. Reference numeral 603 denotes a module ID field which stores a module ID for uniquely identifying each program module. The first embodiment adopts a UUID (Universal Unique ID) as the module ID. Reference numeral 604 denotes a launching flag field which stores information ("to be launched" or "not to be launched") for identifying whether a program module is set to be launched. Reference numeral 605 denotes a module field which stores a reference to the entity of a program module. A program module referred to by the program management unit 501 is executed in accordance with the contents of the launching flag field 604.

The first embodiment employs the table shown in FIG. 6 as a method of managing a program module to be launched. However, the management method is not limited to the table in the first embodiment as far as an associated program module and whether to launch it can be identified. Also, information for uniquely identifying a program module is not limited to the UUID in the first embodiment.

Figure 7:
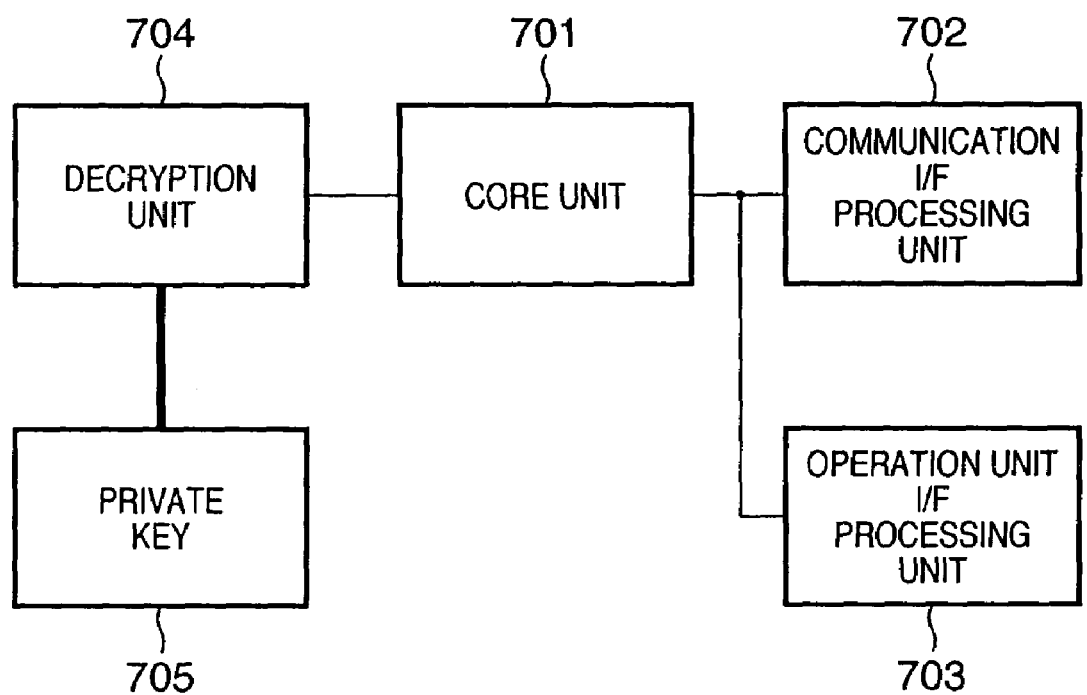
FIG. 7 is a block diagram showing the functional arrangement of software in a license management unit according to the first embodiment.

FIG. 7 is a functional block diagram showing the functional arrangement of the license management unit 503 according to the first embodiment.

Reference numeral 701 denotes a core unit which forms the core of the license management unit 503 and executes a process in accordance with the flowchart shown in FIG. 15 (to be described later). Reference numeral 702 denotes a communication I/F processing unit which communicates with the communication unit 102. Reference numeral 703 denotes an operation unit I/F processing unit which communicates with the operation unit 106. Reference numeral 704 denotes a decryption unit which performs a decryption process for decrypting license information (to be described later). Reference numeral 705 denotes a private key which is private key information used to decrypt a cipher by the decryption unit 704.

The first embodiment adopts a method using a public key and private key for encryption and decryption of license information, but the present invention is not limited to this method and may use only a private key. Needless to say, the private key 705 is paired with a public key (to be described later).

FIG. 8A depicts a table for explaining management information managed by the core unit 701 of the license management unit 503 according to the first embodiment.

Reference numeral 801 denotes a module ID field which stores ID information for specifying a program module managed by the core unit 701. The module ID field 801 stores the contents of the module ID 603 (FIG. 6). Reference numeral 802 denotes a license flag which represents identification information for identifying license information supplied to a module in the module ID field 801, and exhibits which of licenses (expiration date, total print count, and total document count: to be described below) is referred to by each bit of data. A license item having a bit 0 means that no license exists. This license flag can store 16 bits, i.e., the presence/absence of the licenses of 16 items. A license item having "1" at only the most significant bit, i.e., (0×8000) corresponds to an expiration date 803. A total print count 804 corresponds to the next lower bit (0×4000), and a total document count 805 corresponds to the second next lower bit (0×2000). These pieces of identification information do not limit the first embodiment.

The field 803 stores license information on the expiration date. The first embodiment uses an absolute date (year, month, day), but may use a valid period representing the number of valid days. The field 804 stores license information on the total number of printable sheets. The field 805 stores license information on the total number of printable document sheets. Note that the contents of usable or executable resources are not limited to those in the first embodiment, and for example, the number of bytes of data sent to a network may be employed.

In FIG. 8A, reference numeral 810 corresponds to a PDL expansion module (1) in FIG. 6; numeral 811 corresponds to an image compression/decompression module (1); and numeral 812 corresponds to a network communication module (1). The number of document sheets scanned by the PDL expansion module (1) is 200,000, and the expiration date of the network communication module (1) is "Jun. 30, 2006".

FIG. 8B depicts a view showing identification information of the image forming apparatus 100. The identification information is information for uniquely identifying the image forming apparatus, and is held in the RAM 202, ROM 203, disk 204, or the like. In the first embodiment, the identification information is a serial number (e.g., "ABC12345678"). The identification information for uniquely identifying a device is not limited to a serial number, unlike the first embodiment, and any information such as a UUID can be adopted as far as a device can be uniquely identified.

Figure 9:
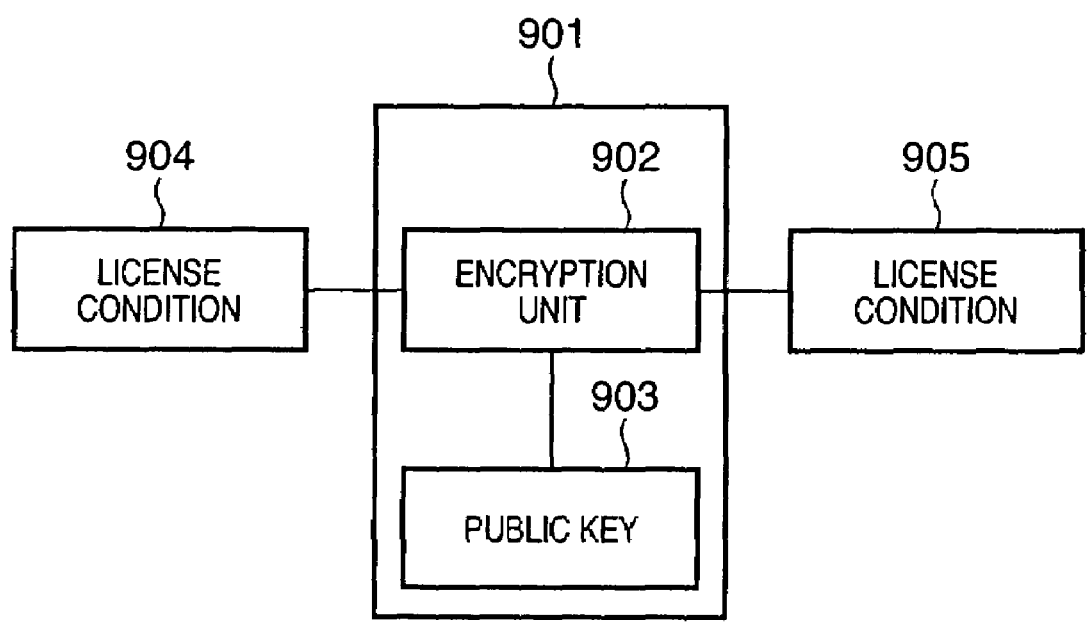
FIG. 9 is a block diagram for explaining the software arrangement of a tool in the PC according to the first embodiment.

FIG. 9 is a block diagram showing the software arrangement of a tool for generating license information in a PC according to the first embodiment.

A tool 901 comprises an encryption unit 902 and public key 903 (to be described next). When the encryption unit 902 receives a license condition 904 (to be described later), the unit 902 performs encryption using the public key 903, and outputs license information 905. The public key 903 is paired with the above-described private key 705. The license condition 904 contains information necessary to generate the license information 905. The license information 905 is transferred to the above-described license management unit 503 to control launching of a predetermined program module.

FIG. 10 depicts a table showing an example of the contents of the license condition 904 according to the first embodiment. The table contains information representing the items of data and the contents of the items. These pieces of information may be held as text data or binary data, and the data format is not particularly limited.

In FIG. 10, reference numeral 1001 denotes a data item representing a serial number. Identification information (FIG. 8B) for uniquely specifying the image forming apparatus 100 of the first embodiment is set in the data item 1001. Reference numeral 1002 denotes a module ID which stores the same information (facsimile scan module) as the module ID 603 in FIG. 6. The first embodiment will exemplify the module ID of a facsimile scan module. Reference numeral 1003 denotes a license flag (e.g., "0×a000" indicates including the expiration date and the total document count) which corresponds to the license flag 802 shown in FIG. 8A. Reference numeral 1004 denotes an expiration date (Dec. 31, 2099) which exhibits a period during which the program module (facsimile scan module) designated by the module ID 1002 can be utilized. Reference numeral 1005 denotes a field which stores license information on the total print count (0). In the example of FIG. 10, reference to the license field 1005 is prevented by the license flag 1003. Reference numeral 1006 denotes a field which stores license information on the total document count. In the first embodiment, 1,000,000 document sheets can be utilized. Note that the contents of usable or executable resources are not limited to those in the first embodiment, and for example, the number of bytes of data sent to a network may be employed.

In the first embodiment, the license information 905 is generated in advance and stored at a predetermined location in the disk 407 of the PC.

Figure 11:
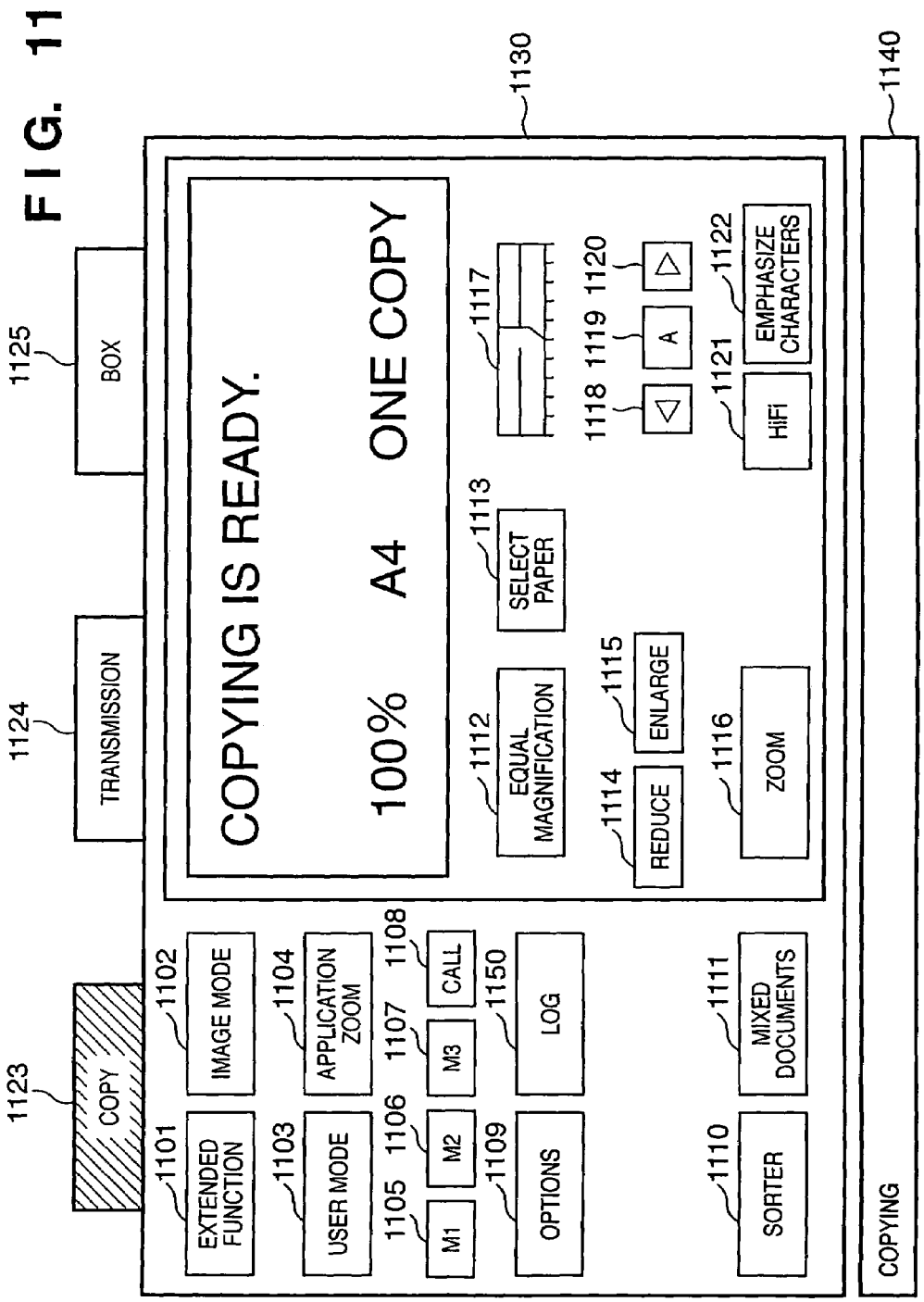
FIG. 11 depicts a view showing an example of a window displayed on the display of the operation unit of the image forming apparatus according to the first embodiment.

FIG. 11 depicts a view showing the arrangement of the operation unit 106 of the image forming apparatus 100 and an example of a window displayed on the display 1130 according to the first embodiment. The display screen is a touch panel, and each function is executed by a touch within the frame of the displayed function.

A copy mode key 1123 is used to designate copying operation. FIG. 11 illustrates an example of a window in the copy mode displayed on the display 1130 when the copy mode key 1123 is touched.

An extended function key 1101 is used to designate shift to a mode for double-sided copying, multicopying, move, margin setting, frame erasure setting, and the like. An image mode key 1102 is used to set a mode for hatching, shading, trimming, or masking a copy image. A user mode key 1103 is used to perform registration of a mode memory and setting of a standard mode window. An application zoom key 1104 is used to set a mode in which the scaling ratio is changed independently in the X and Y directions of a document and a zoom program mode in which the scaling ratio is calculated from the document size and copy size. An M1 key 1105, M2 key 1106, and M3 key 1107 are used to invoke their registered mode memories. An option key 1109 is used to set optional functions such as a film projector function in order to directly copy a film. A sorter key 1110 is used to set sorting, no-sorting, and grouping. A mixed-document key 1111 is touched when A4- and A3-size document sheets or B5- and B4-size document sheets are set together on a document feeder. An equal-magnification key 1112 is touched when the copying magnification is 100%. A paper selection key 1113 is touched to select a copying sheet. A reduction key 1114 and enlargement key 1115 are touched to perform standard-size reduction and enlargement. As for density keys 1118 and 1120, data is copied at a high density every time the key 1118 is touched, and at a low density every time the key 1120 is touched. A density display 1117 changes its display right and left when the density keys 1118 and 1120 are touched. An AE key 1119 is touched to copy a document such as a newspaper whose background is dark by automatic density adjustment. A HiFi key 1121 is touched to copy a document such as a photographic document with a high halftone density. A character emphasis key 1122 is touched to emphasize characters in copying a text document. A transmission mode key 1124 is touched to perform FAX transmission or the like. A box mode key 1125 is touched to process data stored in a box. A status line 1140 displays a message representing the current status of the apparatus or print information. In FIG. 11, the status line 1140 displays "copying". A log key 1150 can display log information of completed print jobs by touching the log key 1150. For example, pieces of information such as the end time, user name, and file name of a print job and the number of prints of the job are displayed.

FIG. 12 depicts a view showing an example of a window which designates loading of license information displayed on the display 1130 of the operation unit 106 of the image forming apparatus according to the first embodiment of the present invention. This window can be operated by only a special operator such as a serviceman. The window shown in FIG. 11 shifts to the window in FIG. 12 by special operation using a ten-key pad (not shown) or the like. In the first embodiment, a program which controls the window runs in the license management unit 503.

Reference numeral 1201 denotes a field for inputting license information. In the first embodiment, license data (faxscan.dat) in the folder (Licence) of the disk 407 of PC 1 (302) in the network 305 is designated. Reference numeral 1202 denotes an OK button which designates loading of license information from the PC 302. By clicking the button 1202, a process shown in the flowchart of FIG. 14 (to be described later) is executed. Reference numeral 1203 denotes a cancel button which designates interruption of a process on the window and return to a predetermined window. In the first embodiment, when the cancel button 1203 is clicked, the window returns to the copy mode window of FIG. 11.

Note that the license information designation method is not particularly limited to the method of the first embodiment. Images of the PCs 302, 303, and 304 in the network 305 may be visually aligned, and the contents of the disk 407 in each PC may be visually displayed to allow selecting license information. The PC 302 in the network 305 is used as the storage destination of license information. The storage destination may be the locally connected PC 304 or a removable storage device (not shown).

FIGS. 13A and 13B depict views for explaining an example of a display on the display 1130 when the license information loading designation button 1202 is clicked in the state of FIG. 12.

FIG. 13A depicts a view showing an example of a normal end window displayed when a license information loading process is successful. Reference numeral 1302 denotes a button for closing the window of FIG. 13A. When the OK button 1302 is clicked, the window shifts to the window of FIG. 12. FIG. 13B depicts an error end window displayed when a license information loading process fails. Reference numeral 1304 denotes an OK button for closing the window of FIG. 13B. When the OK button 1304 is clicked, the window shifts to the window of FIG. 12.

Figure 14:
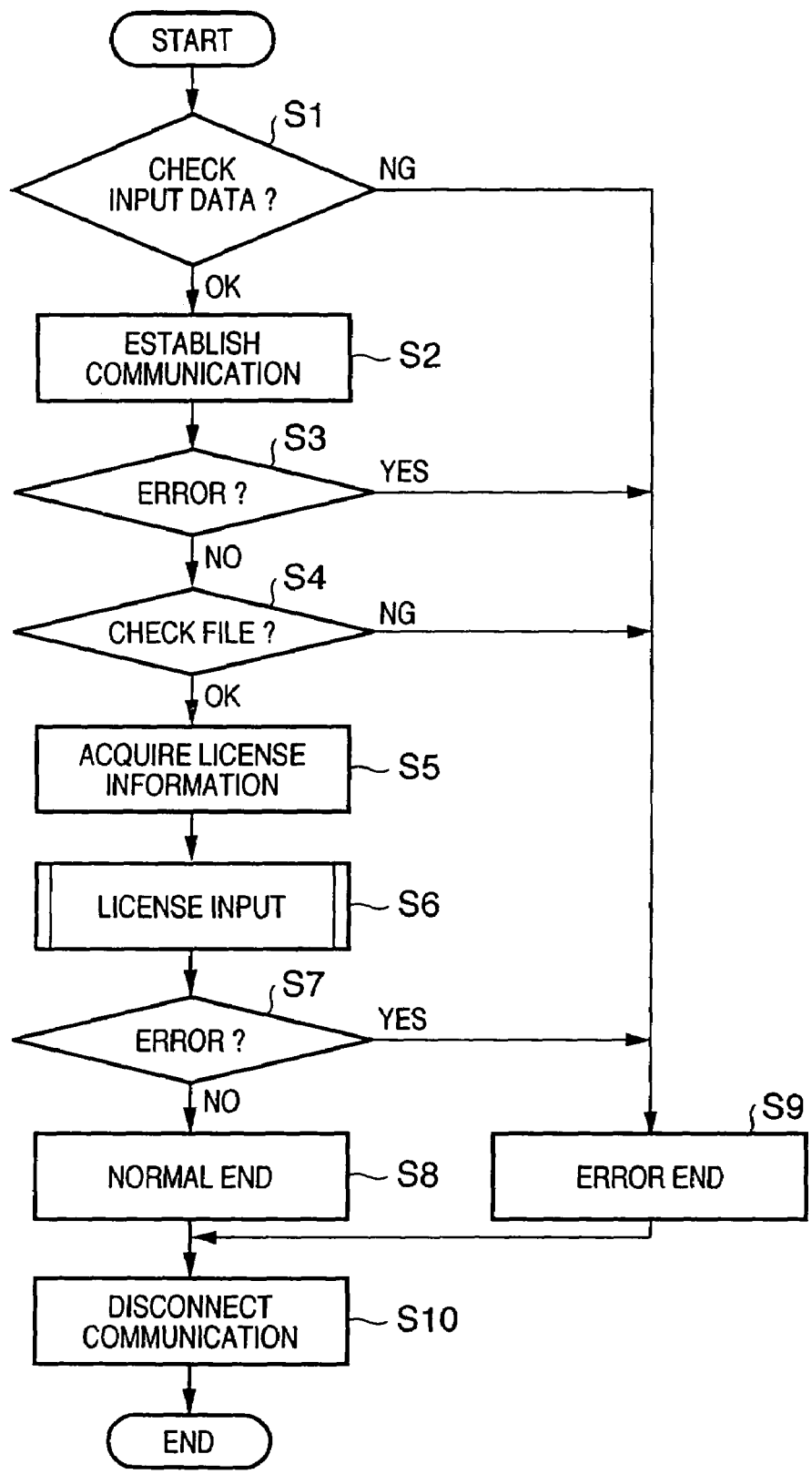
FIG. 14 is a flowchart showing a license information loading process in the image forming apparatus according to the first embodiment.

FIG. 14 is a flowchart for explaining a process when the OK button 1202 for designating loading is clicked in the state shown in FIG. 12. A program which executes this process is stored in the RAM 202 and executed under the control of the CPU 201. The program which executes this process may be stored in the ROM 203.

In step S1, the validity of data input to the input field 1201 is determined. If the input data is valid, the flow advances to step S2; if invalid, to step S9 to end the process as an error. In step S2, the communication interface 408 of the PC 302 is connected via the network 305 by using the communication unit 102 in order to establish communication with the storage destination (in this case, the PC 302) of license information input to the input field 1201. The flow advances to step S3 to determine the communication establishment process result in step S2. If an error occurs, the flow advances to step S9; if normal communication is possible, to step S4 to determine whether license information input to the input field 1201 exists. This is determined by exchanging data with the connected PC 302. If no license information exists in the PC 302, the flow advances to step S9; if license information exists, to step S5 to acquire the license information 905 from the PC 302. In this case, for example, license information stored in the disk 407 of the PC 302 is read out and stored in the RAM 202 or disk 204 of the image forming apparatus 100. The process advances to step S6 to perform a license input process for actually reflecting, in the image forming apparatus 100, the license information stored in step S5. A process by the license management unit 503 in FIG. 5 is executed. The process of the license management unit 503 will be described in detail later with reference to the flowchart of FIG. 15.

The flow advances to step S7 to determine the process result in step S6. If the process normally ends, the flow advances to step S8; if an error occurs, to step S9. In step S8, the normal end window shown in FIG. 13A is displayed, and when the OK button 1302 is clicked, the step ends. In step S9, the error end window shown in FIG. 13B is displayed, and when the OK button 1304 is clicked, the step ends. The flow advances to step S10 to disconnect communication with the PC 302.

In this manner, license information can be acquired from a PC connected to a network by using the operation unit 106 of the image forming apparatus 100 according to the first embodiment, and stored in the internal memory of the apparatus 100.

Figure 15:
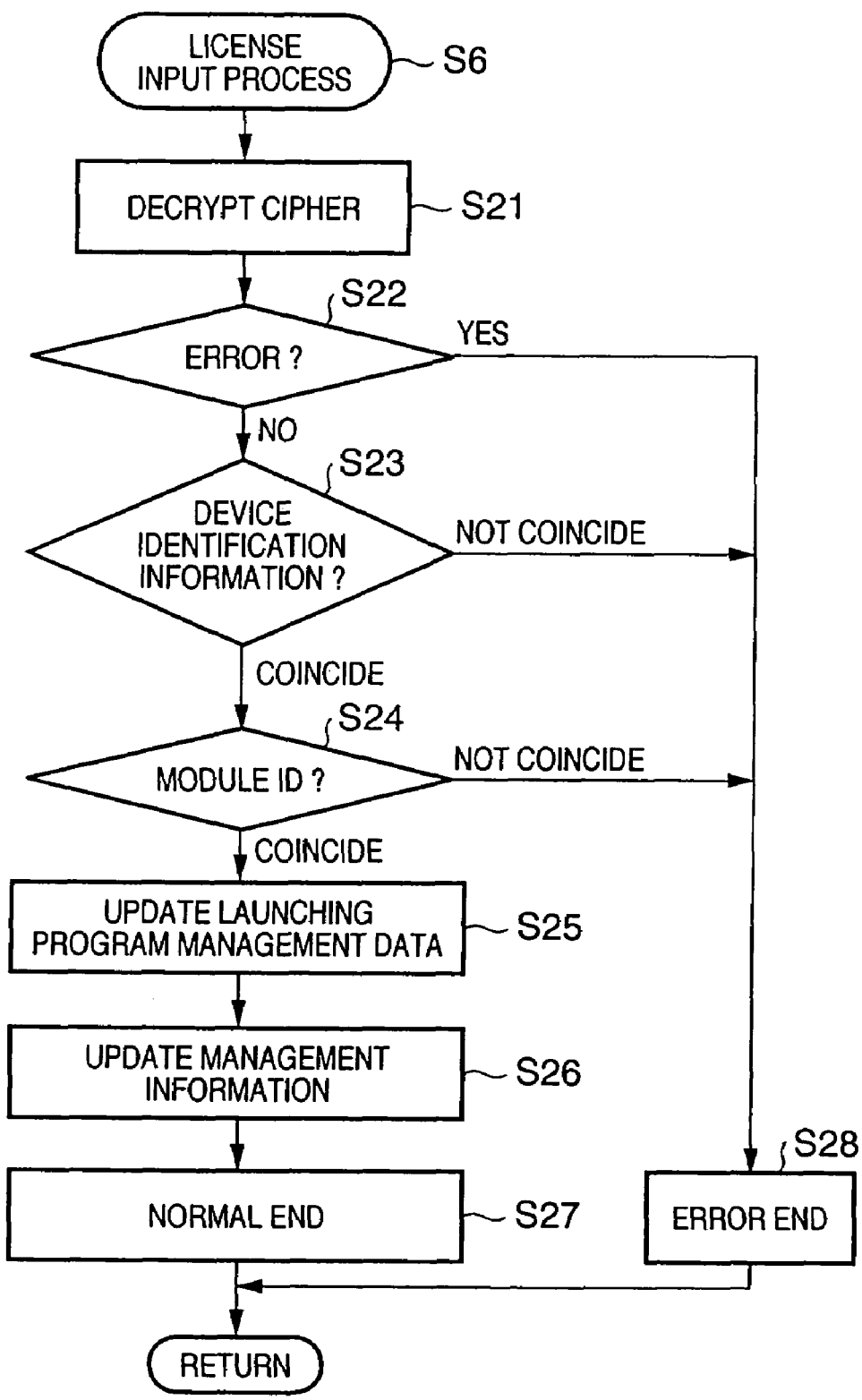
FIG. 15 is a flowchart showing a license information process in step S6 of FIG. 14.

FIG. 15 is a flowchart showing the process of the license management unit 503 (process by the core unit 701 in FIG. 7), i.e., details of step S6 in FIG. 14 according to the first embodiment.

In step S21, encrypted license information is decrypted. The license information 905 acquired in step S5 is encrypted in the PC 302 and then transmitted. For this reason, a process of decrypting the encrypted license information by the decryption unit 704 using the private key 705 and acquiring the license condition 904 is performed. The flow advances to step S22 to determine whether decryption is successful. If decryption fails, the flow advances to step S28 to execute an error process. If decryption is successful at step S22, the flow advances to step S23 to compare device identification information shown in FIG. 8B and the serial number 1001 (FIG. 10) serving as device identification information of the decrypted license condition 904. If these pieces of information do not coincide with each other, the flow advances to step S28; if they coincide with each other, to step S24 to compare each module ID 603 of launching program management data (FIG. 6) held by the launching program identification unit 502 and the module ID 1002 (FIG. 10) of the license condition 904. If coincident data exists, the flow advances to step S25; if no coincident data exists, to step S28. In step S25, data of the launching program management data (FIG. 6) of the launching program identification unit 502 is updated. That is, data which coincides with the module ID 1002 (FIG. 10) of the license condition 904, i.e., a facsimile scan module with module No. 4 in FIG. 6 is changed to an launching target (see FIG. 16). The flow advances to step S26 to update management information managed by the license management unit 503. At this time, if data which coincides with the module ID 1002 exists, the record is updated; if no coincident data exists, a record is added (see FIG. 17). The flow advances to step S27 to set a status representing a normal end. In step S28, a status representing an abnormal end of the process is set.

By the above process, a module which satisfies a license condition acquired from a PC is so set as to be activated. The module can be activated immediately after the controller 101 is activated.

FIG. 16 depicts a table showing an example of launching program management data after the flowchart shown in FIG. 15 normally ends. The facsimile scan module with module No. 4 is changed from "not to be launched" to "to be lunched" in FIG. 6, and defined as an launching target.

FIG. 17 depicts a table for explaining a state in which management information in FIG. 8A is updated after the process shown in the flowchart of FIG. 15 normally ends.

As is apparent from a comparison between FIGS. 8A and 17, a facsimile scan module (corresponding to module No. 4 in FIG. 6) is added as management information. Reference numeral 813 denotes management information for the facsimile scan module. The license flag 802 is set to (0×A000) in order to refer to an expiration date and the total document count. The expiration date is set to "Dec. 31, 2099", and the total document count is set to "1,000,000".

FIG. 18 depicts a table for explaining a use resource counting table held by the use resource counting unit 504 of the program executed by the controller 101 of the image forming apparatus 100 according to the first embodiment. In the first embodiment, the use resource counting unit 504 is notified of a module ID and use resource contents every time the scanner engine 103, printer engine 104, and FAX board 105 execute predetermined processes and consume resources. The use resource counting table is updated on the basis of the notification. Note that the notification timing and resource type are not limited to the contents of the first embodiment.

In FIG. 18, reference numeral 1801 denotes a module ID which is managed by the use resource counting unit 504. In the first embodiment, module IDs for using the scanner engine 103, printer engine 104, and FAX board 105 are managed. Targets to be counted by the use resource counting unit 504 are not limited to the scanner engine 103, printer engine 104, and FAX board 105, and for example, the number of bytes of a packet to be sent to the network 305 may be counted. Reference numeral 1802 denotes an item for counting the total number of print sheets. The item 1802 is counted up in response to a 1-page printing end notification from the printer engine 104. Reference numeral 1803 denotes an item for counting the total number of document sheets. The item 1803 is counted up in response to a 1-document sheet scanning completion notification from the scanner engine 103. Reference numeral 1804 denotes an item for counting the number of FAX transmission pages. The item 1804 is counted up in response to a 1-page transmission completion notification from the FAX board 105.

Reference numeral 1810 corresponds to a PDL expansion module (1) (FIG. 16); numeral 1811 corresponds to a PDL expansion module (2) (FIG. 16); numeral 1812 corresponds to an image compression/decompression module (1) (FIG. 16); and numeral 1813 corresponds to a facsimile scan module (FIG. 16). In FIG. 18, the number of images which are expanded by the PDL expansion module (1) and printed is 54,562. The number of document sheets scanned by the image compression/decompression module (1) is 658,898.

Figure 19:
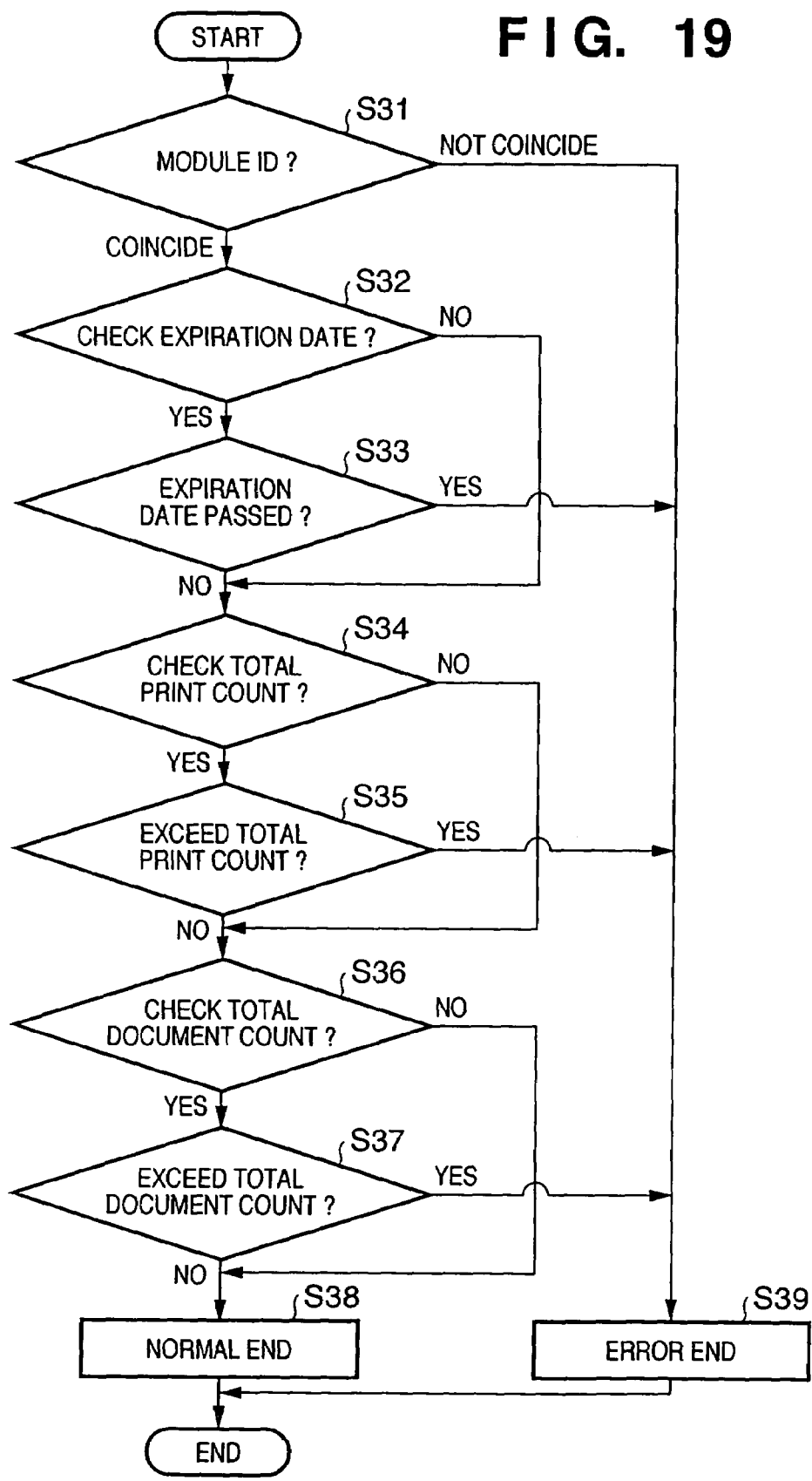
FIG. 19 is a flowchart for explaining a process of operation determination (S7 in FIG. 14) in the image forming apparatus according to the first embodiment.

FIG. 19 is a flowchart showing a process by the operation determination module of the license management unit 503. This process is invoked to determine whether to start a process before all program modules managed by launching program management data as shown in FIG. 6 commence processes using resources. In invoking the process, an invoking program module presents a module ID.

In step S31, it is determined whether the module ID presented by the invoking program module coincides with each module ID 801 of management information (FIG. 8A) managed by the license management unit 503. If YES in step S31, the flow advances to step S32; if NO, to step S39. In step S32, it is determined whether or not to check the expiration date. This is determined on the basis of whether the most significant bit of the license flag 802 for the corresponding module ID in the management information of FIG. 8A is "1". If the most significant bit is "1", the flow advances to step S33; if not "1", to step S34. In step S33, it is determined whether the expiration date has already passed. This is determined by comparing the expiration date 803 for the corresponding module ID of the management information and the time count value of the timer 212. If the expiration date has not passed yet, the flow advances to step S34; if the expiration date has passed, to step S39. In step S34, it is determined whether or not to check the total print count. At this time, it is determined whether the second bit from the most significant bit of the license flag 802 for the corresponding module ID of the management information is "1". If the second bit is "1", the flow advances to step S35; if not "1", to step S36. In step S35, it is determined whether the total print count has exceeded a predetermined value. More specifically, the total print count 804 for the predetermined module ID of the management information and the total print count 1802 (FIG. 18) for the module ID in the use resource counting table held by the use resource counting unit 504 are compared. If the total print count is equal to or smaller than the predetermined value, the flow advances to step S36; if the count is larger, to step S39. In step S36, it is determined whether or not to check the total document count. This is determined on the basis of whether the third bit from the most significant bit of the license flag 802 for the corresponding module ID in the management information of FIG. 8A is "1". If the third bit is "1", the flow advances to step S37; if not "1", to step S39. In step S37, it is determined whether the total document count has exceeded a predetermined value. This is determined by comparing the total document count 805 for the corresponding module ID of the management information and the total document count 1803 for the corresponding module ID in the use resource counting table held by the use resource counting unit 504. If the total document count has not exceeded the predetermined value, the flow advances to step S38; if the count has exceeded the predetermined value, to step S39. In step S38, a status representing a normal end of the process is set. In step S39, a status representing an abnormal end of the process is set.

By the above-described process, it can be determined whether or not to commence a process by a module before all program modules managed by the launching program management data commence processes using resources. A module whose items such as the expiration date, total print count, and total document count are to be checked can be launched only when these items fall within their set values.

In the first embodiment, it is determined that the expiration date has passed and use resource is not available in accordance with the flowchart shown in FIG. 19 only before the start of a process. Alternatively, the process of the flowchart shown in FIG. 19 may be invoked every time the use resource counting table (FIG. 18) of the use resource counting unit 504 is updated.

Figure 20:
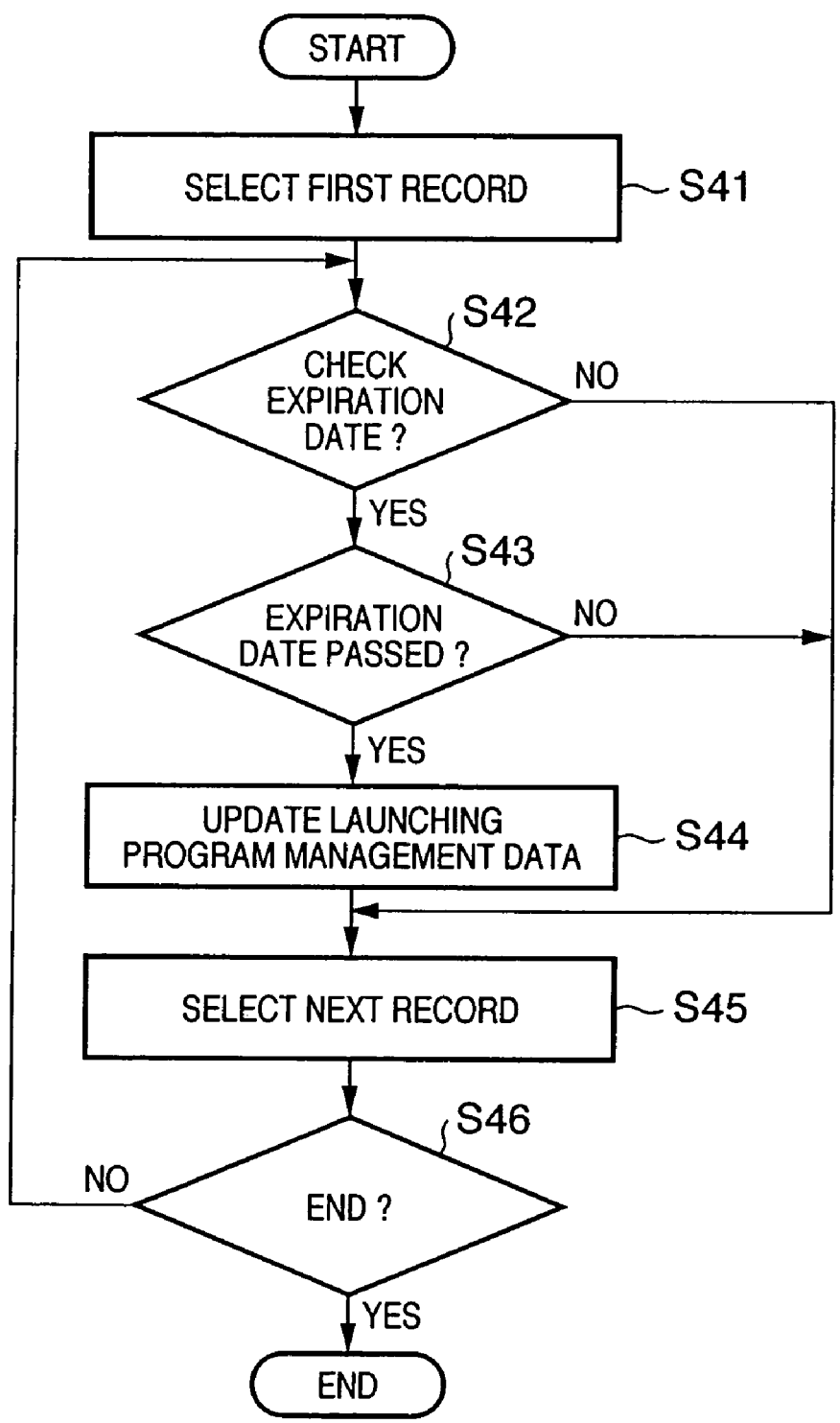
FIG. 20 is a flowchart for explaining an expiration date confirmation process in the image forming apparatus according to the first embodiment.

FIG. 20 is a flowchart for explaining a process of confirming the expiration date by the license management unit 503. This process is executed upon updating the date of the timer 212 of the controller 101 in the image forming apparatus according to the first embodiment.

In step S41, the first record of management information managed by the license management unit 503 is selected. The flow advances to step S42 to determine whether or not to check the expiration date. In this case, it is determined whether the most significant bit of the license flag 802 for the module ID of the currently selected record in the management information is "1". If the most significant bit is "1", the flow advances to step S43 to determine whether the expiration date has passed. This is determined by comparing the expiration date 803 for the currently selected module ID of the management information and the time count value of the timer 212. If the expiration date has passed in step S43, the flow advances to step S44 to update data of launching program management data (FIG. 6) in the launching program identification unit 502. In this case, the launching flag 604 of data which coincides with the currently selected module ID is changed to "not to be launched", and the flow advances to step S45. If it is determined in step S42 that the expiration date is not checked, or the expiration date has not passed in step S43, the flow advances to step S45. In step S45, the next record of management information is selected. The flow advances to step S46 to determine whether all records have been processed. If the process has not been completed yet, the flow returns to step S42 to continue the process of the selected record. If the process is completed in step S46, the process ends.

The first embodiment targets only the date as the expiration date, but the present invention may target the time or the time elapsed after given time and is not particularly limited to them.

Figure 21:
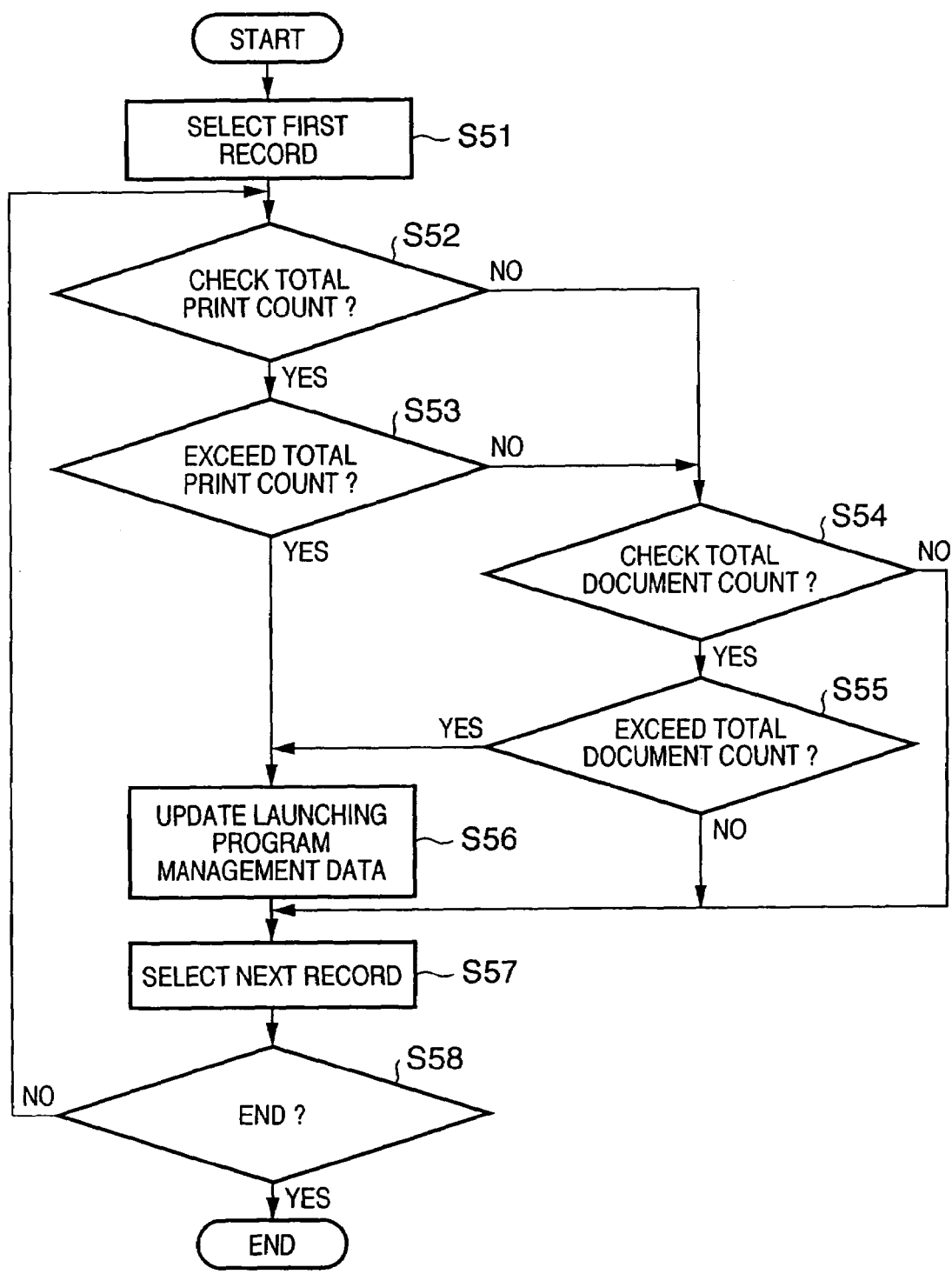
FIG. 21 is a flowchart for explaining a use resource confirmation process in the image forming apparatus according to the first embodiment.

FIG. 21 is a flowchart for explaining a use resource confirmation process by the license management unit 503. This process is executed upon updating the use resource counting table (FIG. 18) held by the use resource counting unit 504 of the controller 101 according to the first embodiment.

In step S51, the first record of management information managed by the license management unit 503 is selected. The flow advances to step S52 to determine whether or not to check the total print count. This is determined on the basis of whether the second bit from the most significant bit of the license flag 802 for the module ID of the currently selected record in the management information is "1". If the second bit is "1", the flow advances to step S53 to determine whether the total print count after printing has exceeded the total print count of the management information. This is determined by comparing the total print count 804 for the currently selected record and the total print count 1802 for the corresponding module ID in the use resource counting table (FIG. 18) held by the use resource counting unit 504. If the total print count 1802 after actual printing has exceeded the total print count 804 of the management information, the flow advances to step S56 to update data of the launching program management data of the launching program identification unit 502. In other words, the launching flag 604 of data which coincides with the currently selected module ID 802 is changed to "not to be launched".

If it is determined in step S52 that the total print count is not checked, or the total print count after actual printing has not exceeded the total print count in step S53, the flow advances to step S54 to determine whether or not to check the total document count. In this case, it is determined whether the third bit from the most significant bit of the license flag 802 for the module ID of the currently selected record is "1". If the third bit is "1", the flow advances to step S55 to determine whether the total document count has exceeded the total document count of the management information. At this time, the total document count 805 for the module ID of the currently selected record and the total document count 1803 for the corresponding module ID in the use resource counting table (FIG. 18) held by the use resource counting unit 504 are compared. If the total document count 1803 is larger, the total document count is determined to have exceeded the count. If the total document count has exceeded the count, the flow advances to step S56; if the total document count has not exceeded the count, to step S57. The next record of the management information is selected in step S57, and it is determined whether all records have been processed in step S58. If the process for all records has not been completed yet, the flow returns to step S52 to continue the process of the selected record in step S57. If the process for all records is completed in step S58, the process ends.

The first embodiment targets only the total print count and total document count, but the present invention is not limited to them and may target another resource.

Second Embodiment

The second embodiment of the present invention implements the same functions as those of the first embodiment in response to not a manipulation from the operation unit 106 in the first embodiment, but an instruction from an application running in a PC. More specifically, an image forming apparatus 100 according to the second embodiment is equipped with an HTTP server module for external communication via a communication unit 102, and license information 905 is transmitted from a general Web browser application in the PC. The hardware arrangement of the image forming apparatus according to the second embodiment is the same as that in the first embodiment, and a description thereof will be omitted.

Figure 22:
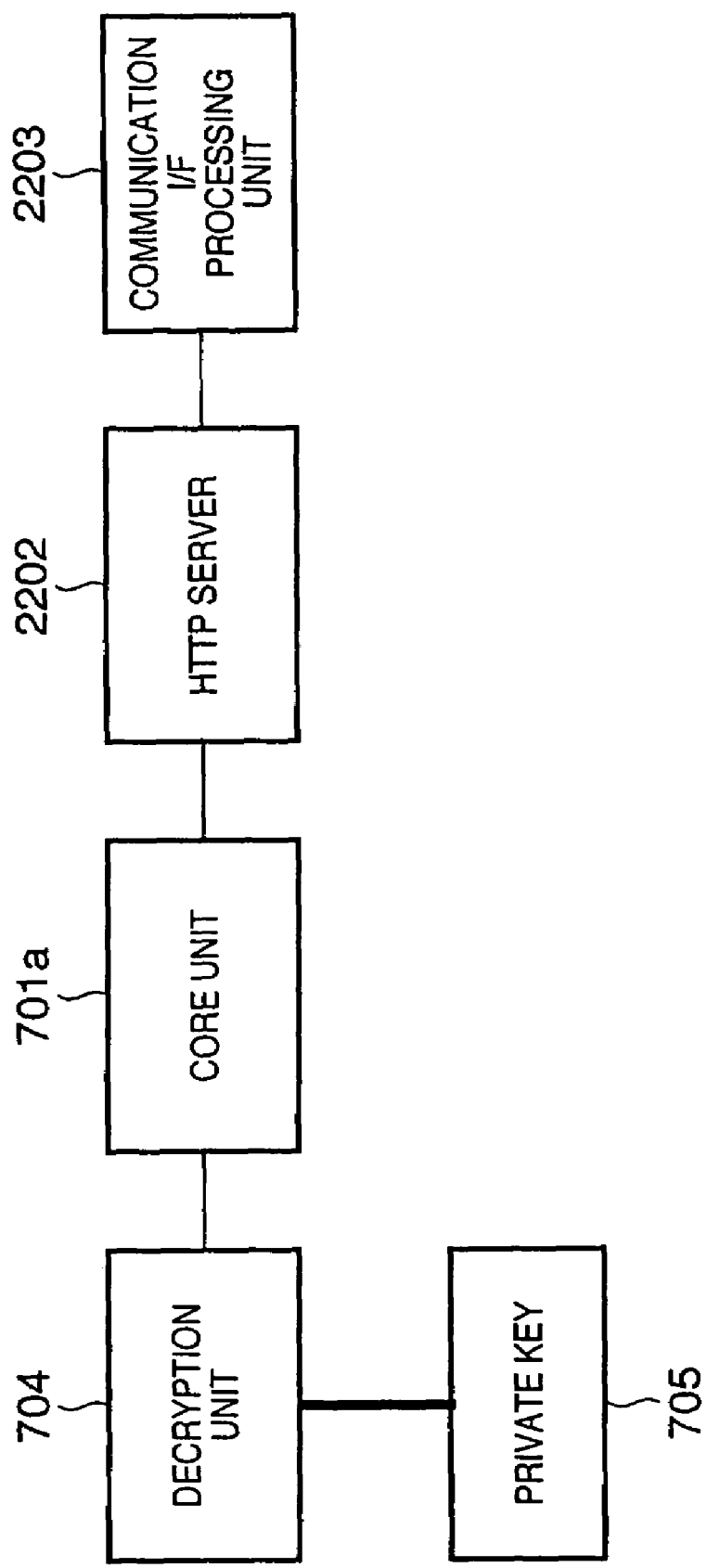
FIG. 22 is a block diagram showing the functional arrangement of a license management unit in an image forming apparatus according to a second embodiment.

FIG. 22 is a functional block diagram showing the functional arrangement of a license management unit 503 in the image forming apparatus according to the second embodiment of the present invention. The same reference numerals as in FIG. 7 denote the same parts.

Figure 24:
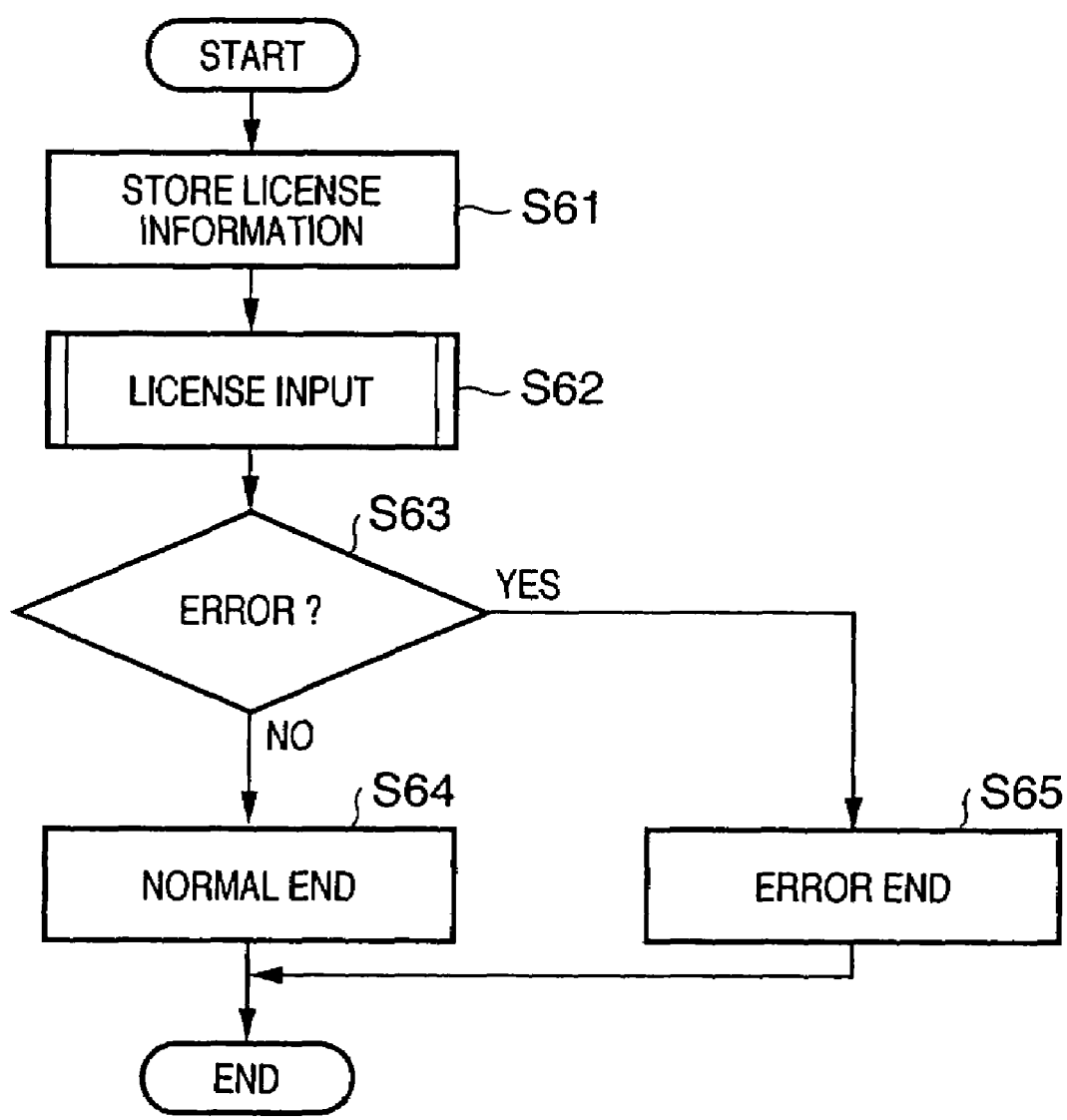
FIG. 24 is a flowchart for explaining a process by the license management unit in the image forming apparatus according to the second embodiment of the present invention.

Reference numeral 701a denotes a core unit of the license management unit 503 in which a process is executed in accordance with the flowchart shown in FIG. 24. Reference numeral 2202 denotes an HTTP server which enables access by a browser application from a PC connected via the communication unit 102. The server module for communication with the PC is not particularly limited to the HTTP server. Reference numeral 2203 denotes a communication I/F processing unit which communicates with the communication unit 102.

The second embodiment employs a method using a public key and private key for encryption and decryption of license information, but the present invention is not limited to this embodiment. Needless to say, a private key 705 is paired with a public key 903.

Figure 23:
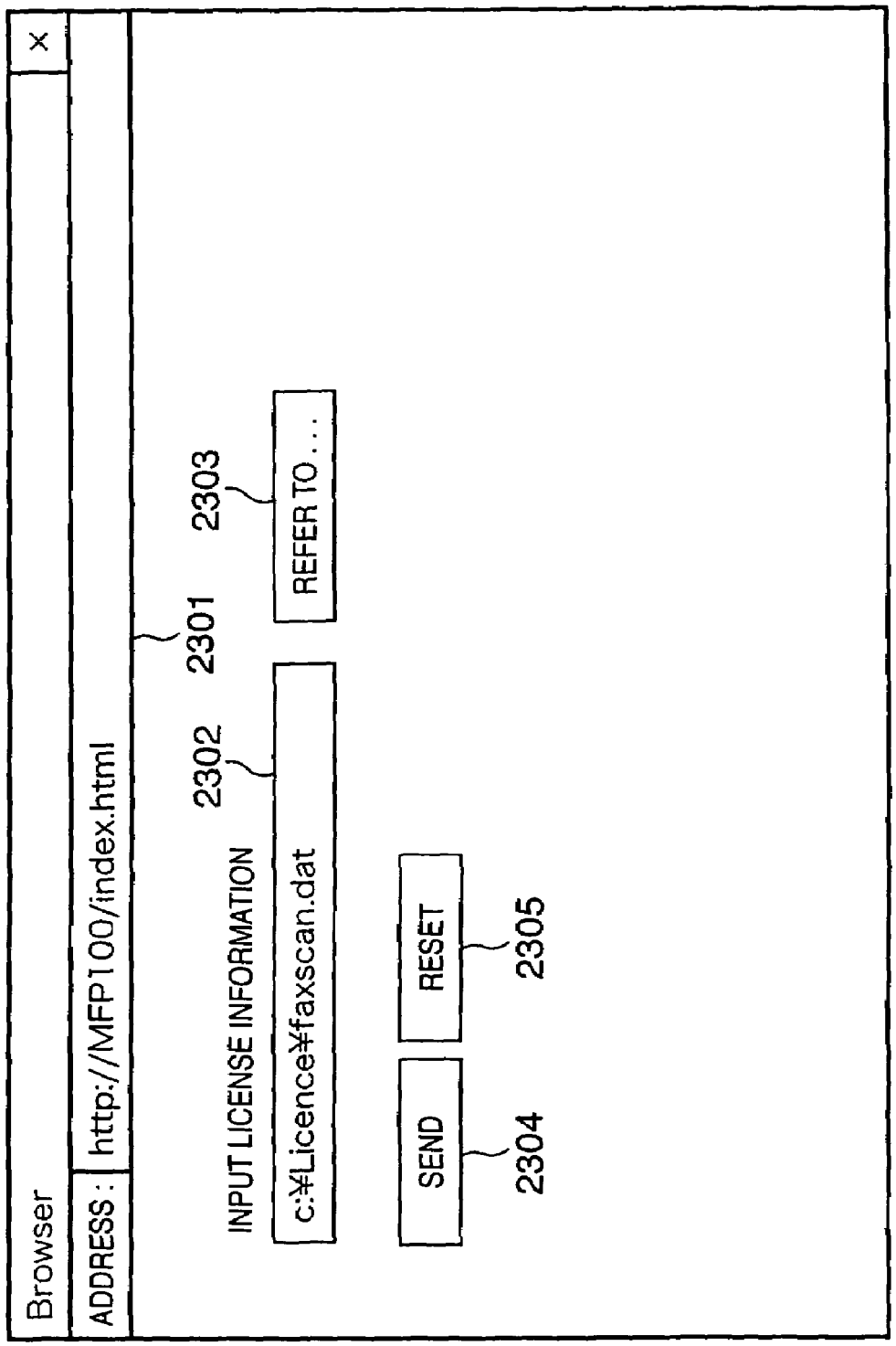
FIG. 23 depicts a view showing an example of a window displayed on the display (monitor) of a PC according to the second embodiment.

FIG. 23 depicts a view showing an example of a homepage which is stored in the disk 204, transmitted from the HTTP server 2202, and displayed on the display 403 of the PC by a browser application running in the PC in the image forming apparatus according to the second embodiment of the present invention.

In FIG. 23, reference numeral 2301 denotes an address of a displayed homepage. The address 2301 represents that the image forming apparatus 100 is designated. Reference numeral 2302 denotes a license information input field which designates license information (faxscan.dat) stored in the folder (Licence) of a drive "c" in the disk 407 of the PC. Reference numeral 2303 denotes a "reference" button which is used to display a file retrieval window (not shown) for facilitating input of license information. Reference numeral 2304 denotes a send button which is used to send, to the image forming apparatus 100, license information input to the input field 2302. In the second embodiment, the send button 2304 is a button for reading out license information from the disk 407 and transferring it. Reference numeral 2305 denotes a reset button for clearing the contents of the input field 2302.

Note that the window displayed on the PC is not particularly limited to the window shown in FIGS. 13A and 13B of the second embodiment.

FIG. 24 is a flowchart showing some of processes executed upon reception of license information by the HTTP server 2202 in the core unit 701a of the license management unit 503 according to the second embodiment.

In step S61, the HTTP server 2202 stores license information transmitted from the PC in the RAM 202 or disk 204. The flow advances to step S62 to input license information for actually reflecting, in the image forming apparatus, the license information stored in step S61. This is shown in the flowchart of FIG. 15 described above. The flow advances to step S63 to determine whether the result of the license information input process in step S62 is correct or not. If the process normally ends, the flow advances to step S64 to set a status representing a normal end of the process, and then the process ends. If an error occurs, the flow advances to step S65 to set a status representing an abnormal end, and then the process ends.

Third Embodiment

The third embodiment of the present invention implements the same functions as those of the first embodiment by periodically checking the presence/absence of license information from the image forming apparatus 100 to a PC and when license information exists, extracting it, instead of an instruction from an application in the PC, unlike the second embodiment. More specifically, the image forming apparatus 100 is equipped with an electronic mail client module, and a PC 303 is equipped with a mail server. The client module periodically inquires the mail server in the PC whether electronic mail has arrived, and when electronic mail has arrived, receives it. License information 905 according to the third embodiment is transmitted to the image forming apparatus 100 as a file attached to the electronic mail.

Figure 25:
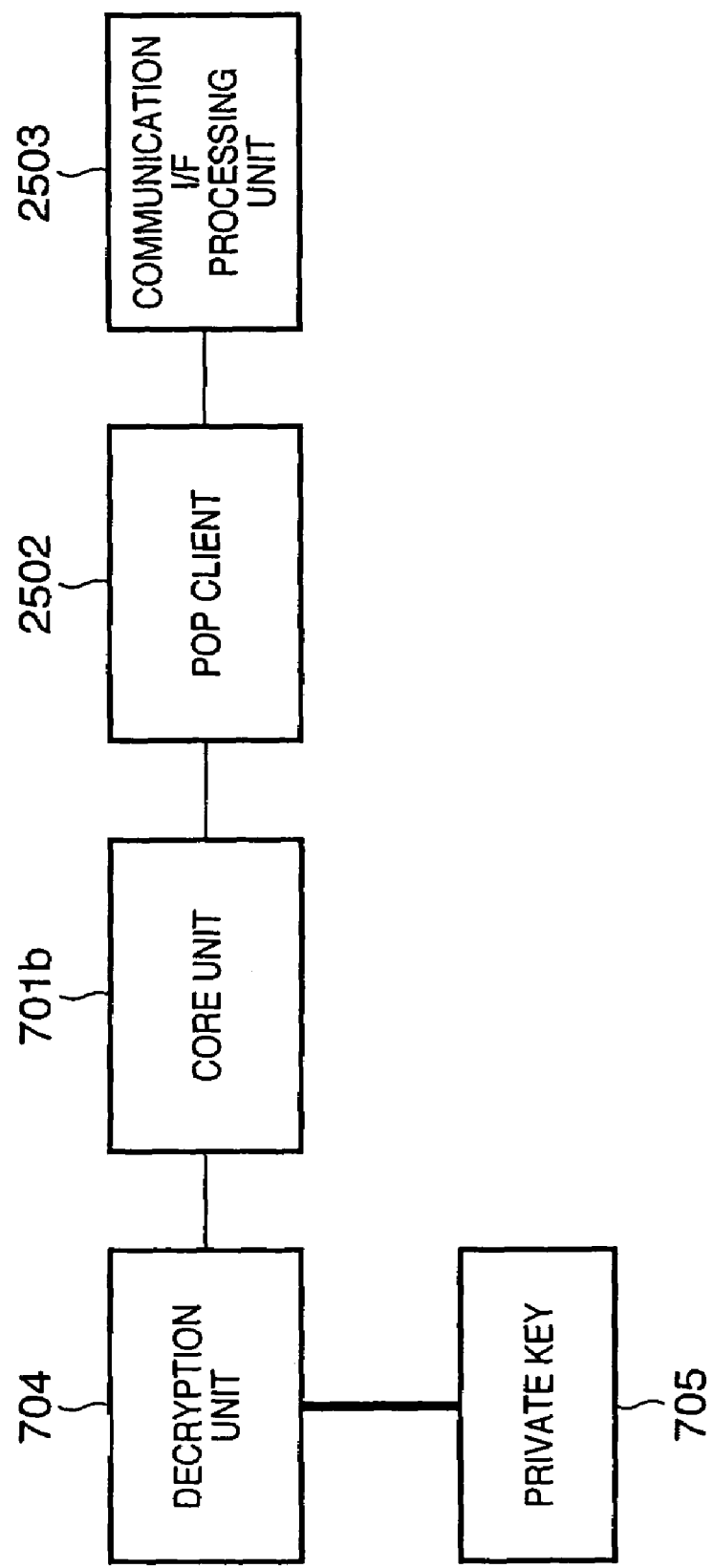
FIG. 25 is a block diagram showing the functional arrangement of a license management unit in an image forming apparatus according to a third embodiment of the present invention.

FIG. 25 is a block diagram showing the functional arrangement of the license management unit 503 in the image forming apparatus according to the third embodiment of the present invention. The same reference numerals as in FIG. 7 denote the same parts.

Reference numeral 701b denotes a core unit of the license management unit 503 according to the third embodiment in which a process is executed in accordance with the flowchart of FIG. 24. Reference numeral 2502 denotes a POP client capable of accessing a mail server PC (e.g., 303) which is connected via the communication unit 102 and has a network account, and receiving electronic mail form the PC. In the third embodiment, setting of the account for the mail server PC 303 and setting of the POP client 2502 are done in advance by a general method (not shown). Reference numeral 2503 denotes a communication I/F processing unit which communicates with the communication unit 102.

The third embodiment employs a method using a public key and private key for encryption and decryption of license information, but the present invention is not limited to this embodiment. Needless to say, a private key 705 is paired with a public key 903. Further, a process of communicating with a PC or the like and receiving data is not limited to the POP client.

A license information input process according to the third embodiment will be briefly explained with reference to the flowchart of FIG. 24. Assume that the mail server PC 303 has transmitted the license information 905 together with electronic mail to the image forming apparatus 100 in advance.

In step S61, the POP client 2502 stores license information received from the mail server PC 303 in a RAM 202 or disk 204. In step S62, in order to actually reflect the stored license information in the image forming apparatus, a license information input process is performed (FIG. 15). In step S63, it is determined whether the process normally ends. If the process normally ends, the flow advances to step S64 to set a status representing a normal end; if an error occurs, the flow advances to step S65 to set a status representing an abnormal end.

Fourth Embodiment

In the fourth embodiment according to the present invention, unlike the first embodiment, information which uniquely identifies license information and launching information which designates launching/stop of an application program are added to the license information. Launching/stop control of the application program is executed in accordance with the contents of the license information. Also, the fourth embodiment inhibits reuse of license information which has been used once.

FIG. 26 depicts a table showing an example of the contents of a license condition 904 shown in FIG. 9. The table is comprised of information representing the items of data and the contents of the items. These pieces of information may be held as text data or binary data, and the data format is not particularly limited. In FIG. 26, the same reference numerals as in FIG. 10 denote the same parts.

A serial number 1001 is information which uniquely specifies the image forming apparatus according to the fourth embodiment, and is the same information as identification information (FIG. 8B) held by the image forming apparatus. Reference numeral 2602 denotes license identification information for uniquely specifying license information. The fourth embodiment adopts a UUID (Universal Unique ID). A module ID 1002 will be described using the module ID of a facsimile scan module.

Reference numeral 2604 denotes launching information which designates launching/stop of a program module specified by the module ID 1002. Reference numeral 2605 denotes a license information executable count. A license flag 1003 to a total document count 1006 have the same meanings as those in the above-described embodiments.

FIG. 27 depicts a table for explaining a license identification information storage unit stored in a RAM 202 or disk 204 of a controller 101 in an image forming apparatus 100 according to the fourth embodiment.

In FIG. 27, reference numeral 2701 denotes a record number at which information is stored. Reference numeral 2702 denotes a field which stores license identification information 2602 of license information which has been processed once.

Reference numeral 2703 denotes a field which stores the remaining use count of a license given by the license identification information 2602.

License identification information is stored in the RAM 202 or disk 204 in the fourth embodiment, but may be stored in a nonvolatile storage medium or a plurality of storage media.

Figure 28:
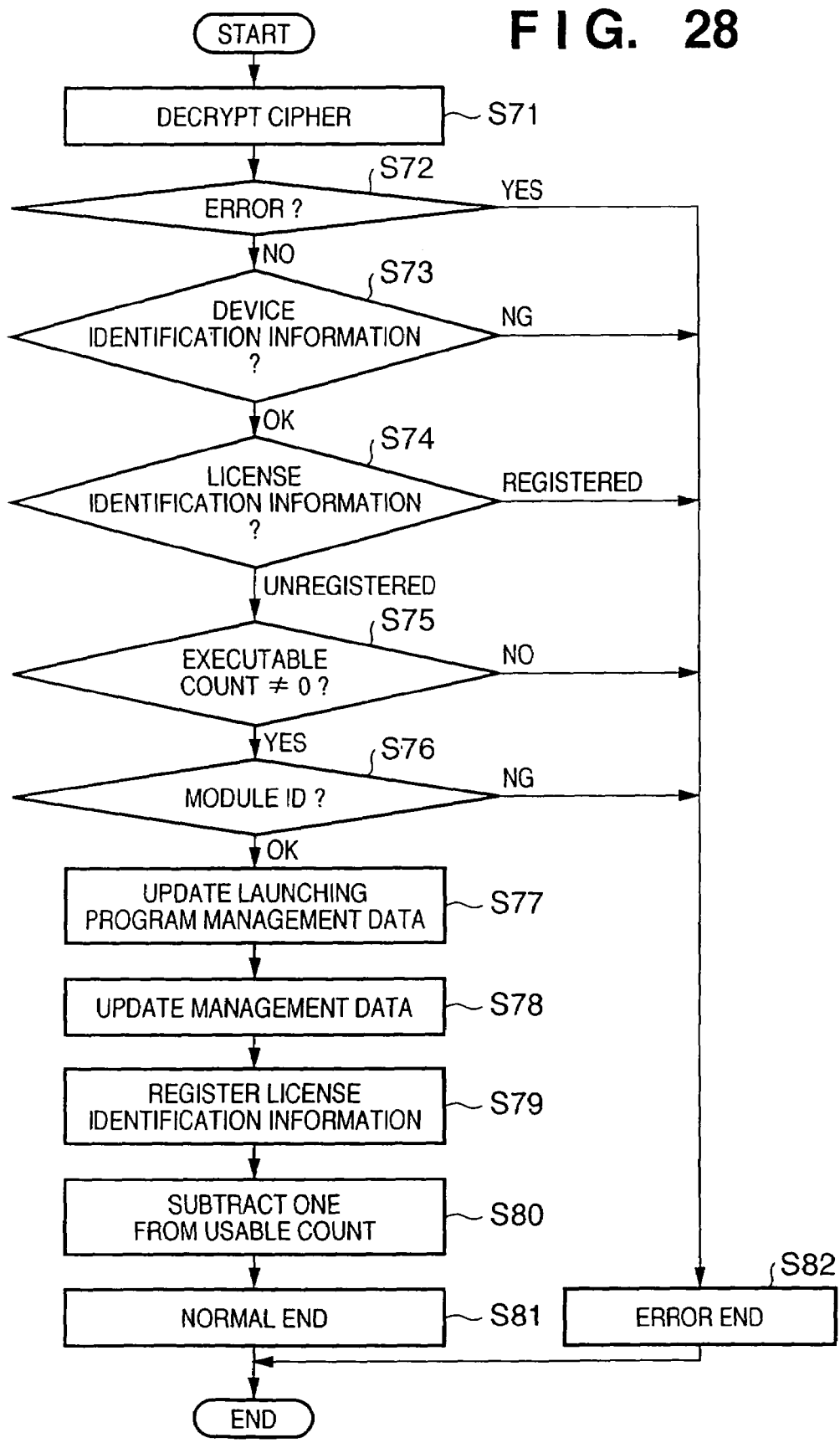
FIG. 28 is a flowchart showing details of a license information input process (corresponding to step S6 of FIG. 14) according to the fourth embodiment of the present invention.

FIG. 28 is a flowchart showing details of a license information input process (corresponding to step S6 of FIG. 14) according to the fourth embodiment of the present invention. This process is executed by the core unit 701 of the license management unit 503.

In step S71, license information 905 acquired in step S5 of FIG. 7 is decrypted by the decryption unit 704 using the private key 705 to acquire the license condition 904. The flow advances to step S72 to determine whether decryption is successful. If decryption is successful, the flow advances to step S73 to compare device identification information of the image forming apparatus and the serial number 1001 serving as device identification information of the decrypted license condition. If these pieces of information coincide with each other, the flow advances to step S74 to determine whether the license identification information 2602 has been stored in the license identification information storage unit (FIG. 27). If the license identification information 2602 has not been stored, the flow advances to step S75 to determine whether the executable count 2703 of a record which coincides with the license identification information 2602 is "0" in the license identification information storage unit (FIG. 27). If the executable count 2703 is not "0", the flow advances to step S76 to compare each module ID of launching program management data (FIG. 6) held by the launching program identification unit 502 and the module ID 1002 (FIG. 10) of the license condition in FIG. 26. If coincident data exists, the flow advances to step S77.

In step S77, data of the launching program management data (FIG. 6) of the launching program identification unit 502 is updated. Data which coincides with the module ID 1002 of the license condition in FIG. 26, i.e., a facsimile scan module with module No. 4 is changed to a launching target (see FIG. 16). The flow advances to step S78 to update management information (FIG. 8A) managed by the license management unit 503. At this time, if data which coincides with the module ID 1002 exists, the record is updated; if no coincident data exists, a record is added (see FIG. 17). The flow advances to step S79 to determine whether the license identification information 2602 has been registered in the license identification information storage unit in FIG. 27. If the license identification information 2602 has not been registered, it is added.

In the fourth embodiment, data is newly stored in a record having a record number 2701 "No. 2" in FIG. 27. The flow advances to step S80 to store a use count in a record in which data coincides with registered one in step S79 or in an added record. When data has already been registered, a value obtained by subtracting one from the executable count 2703 of the record in FIG. 27 is stored. When a record is added, a value obtained by subtracting one from the license information executable count 2605 in FIG. 26 is stored. The flow advances to step S81 to set a status representing a normal end, and then the process ends.

If an error occurs in step S72, device identification information does not coincide with the serial number 1001 in step S73, license identification information has already been registered in step S74, the executable count is "0" in step S75, or module IDs do not coincide with each other in step S76, then the flow advances to step S82 to set a status representing an abnormal end, and then the process ends.

Other Embodiment

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The storage medium for supplying the program codes includes a floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiments.

As has been described above, according to the embodiments, no dedicated rewrite apparatus is required for validating an optional function, and the cost can be reduced. The security of validation of an optional function can be improved by using different pieces of license information for respective image forming apparatuses.

According to the embodiments, an optional function can be validated from a terminal on a communication path such as a network, and no serviceman need to go to the installation place of the apparatus, thus reducing the cost.

According to the embodiments, an optional function can be validated by different communication methods with high convenience.

According to the embodiments, an expiration date and upper use limit are set for each function in license information. This can suppress long-term illegal use.

According to the embodiments, the security is further improved by encrypting license information.

According to the embodiments, a function representing launching/stop of a program module is added within license information. An unused program module can be temporarily stopped, or a stopped program module can be launched again, thereby improving the operability of the whole image forming apparatus.

According to the embodiments, license identification information which identifies license information used once is managed. This can prevent repetitive use of license information over the expiration date, and further improve the security.

According to the embodiments, a careless failure in using license information can be prevented by preventing the use of license information for rewriting set contents.

The embodiments adopt a function capable of using license information a specific number of times. An operation of creating license information every time can be reduced, resulting in high convenience.

The present invention is not limited to the above embodiments and various changes and modifications can be made within the spirit and scope of the present invention. Therefore, to apprise the public of the scope of the present invention, the following claims are made.

What is claimed is:

1. An image forming apparatus which is connected to an external device via a communication unit, comprising:
   a storage unit configured to store identification information for specifying the image forming apparatus;
   a program storage unit configured to store a plurality of program modules for realizing a plurality of functions of the image forming apparatus;
   a launching program identification unit configured to store launching program information for specifying a program module to be executed upon launching among the plurality of program modules stored in said program storage unit;
   a program management unit configured to execute a program module corresponding to the launching program information in a case where the image forming apparatus is activated on the basis of the launching program information stored in said launching program identification unit;
   an acquisition unit configured to acquire, from the external device via the communication unit, license information containing launching program information for specifying identification information of the image forming apparatus, the launching program module and count data for defining an executable count of the program module; and
   an updating unit configured to update the launching program information stored in said launching program identification unit, on the basis of the license information acquired by said acquisition unit,
   wherein launching of the program module corresponding to the launching program defined by the license information is prohibited, in a case where a count in which the program module has been executed is not less than the executable count, and
   wherein in a case where the identification information of the license information acquired by said acquisition unit coincides with the identification information stored in said storage unit, said updating unit updates, as the launching program information, identification information of the program module corresponding to the launching program information contained in the license information.

2. An image forming apparatus which is connected to an external device via a communication unit, comprising:
   a storage unit configured to store identification information for specifying the image forming apparatus;
   a program storage unit configured to store a plurality of program modules for realizing a plurality of functions of the image forming apparatus;
   a launching program identification unit configured to store launching program information for specifying a program module to be executed upon launching among the plurality of program modules stored in said program storage unit;
   a program management unit configured to execute a program module corresponding to the launching program information in a case where the image forming apparatus is activated on the basis of the launching program information stored in said launching program identification unit;
   an acquisition unit configured to acquire, from the external device via the communication unit, license information containing launching program information for specifying identification information of the image forming apparatus, the launching program module and count data for defining an executable count of the program module; and
   an updating unit configured to update the launching program information stored in said launching program identification unit, on the basis of the license information acquired by said acquisition unit,
   wherein launching of the program module corresponding to the launching program defined by the license information is prohibited, in a case where a count in which the program module has been executed is not less than the executable count, and
   wherein said acquisition unit acquires the license information from the external device by designating the external device and a storage location of the external device where the license information is stored.

3. The apparatus according to claim 1, wherein the license information is encrypted, and said acquisition unit decrypts the encrypted license information.

4. The apparatus according to claim 1, further comprising a timer unit configured to measure a time,
   wherein said updating unit updates the launching program information stored in said launching program identification unit, on the basis of the license information in a case where the time measured by said timer unit does not reach an expiration date contained in the license information.

5. An image forming apparatus which is connected to an external device via a communication unit, comprising:
   a storage unit configured to store identification information for specifying the image forming apparatus;
   a program storage unit configured to store a plurality of program modules for realizing a plurality of functions of the image forming apparatus;
   a launching program identification unit configured to store launching program information for specifying a program module to be executed upon launching among the plurality of program modules stored in said program storage unit;
   a program management unit configured to execute a program module corresponding to the launching program information in a case where the image forming apparatus is activated on the basis of the launching program information stored in said launching program identification unit;
   an acquisition unit configured to acquire, from the external device via the communication unit, license information containing launching program information for specifying identification information of the image forming apparatus, the launching program module and count data for defining an executable count of the program module;
   an updating unit configured to update the launching program information stored in said launching program identification unit, on the basis of the license information acquired by said acquisition unit; and
   a counter configured to count the number of images formed in correspondence with the program module,
   wherein launching of the program module corresponding to the launching program defined by the license information is prohibited, in a case where a count in which the program module has been executed is not less than the executable count, and
   wherein said updating unit updates the launching program information stored in said launching program identification unit, on the basis of the license information, in a case where the number of formed images which are counted by said counter and correspond to a launching program contained in the license information is not more than an upper limit value of the number of images contained in the license information.

6. A program launching control method in an image forming apparatus which is connected to an external device via a communication unit, comprising:

a program launching step of launching a launching program module to be executed upon launching by specifying the launching program module from a plurality of program modules in accordance with launching program information;

an acquisition step of acquiring, from the external device via the communication unit, license information containing launching program information for specifying identification information of the image forming apparatus, the launching program module and count data for defining an executable count of the program module; and an updating step of updating, on the basis of the license information acquired in said acquisition step, the launching program information for specifying the launching program module, wherein launching of the program module corresponding to the launching program defined by the license information is prohibited, in a case where a count in which the program module has been executed is not less than the executable count, and wherein in said updating step, in a case where the identification information of the license information acquired in said acquisition step coincides with identification information of the image forming apparatus, identification information of a program module corresponding to the launching program information contained in the license information is updated as the launching program information.

7. A program launching control method in an image forming apparatus which is connected to an external device via a communication unit, comprising:

a program launching step of launching a launching program module to be executed upon launching by specifying the launching program module from a plurality of program modules in accordance with launching program information;

an acquisition step of acquiring, from the external device via the communication unit, license information containing launching program information for specifying identification information of the image forming apparatus, the launching program module and count data for defining an executable count of the program module; and an updating step of updating, on the basis of the license information acquired in said acquisition step, the launching program information for specifying the launching program module, wherein launching of the program module corresponding to the launching program defined by the license information is prohibited, in a case where a count in which the program module has been executed is not less than the executable count, and wherein in said acquisition step, the license information is acquired from the external device by designating the external device and a storage location of the external device where the license information is stored.

8. The method according to claim 6, wherein the license information is encrypted, and said acquisition step comprises a step of decrypting the encrypted license information.

9. The method according to claim 6, further comprising a time count step of measuring a time, wherein in said updating step, the launching program information is updated on the basis of the license information in a case where the time measured in said time count step does not reach an expiration date contained in the license information.

10. A program launching control method in an image forming apparatus which is connected to an external device via a communication unit, comprising:

a program launching step of launching a launching program module to be executed upon launching by specifying the launching program module from a plurality of program modules in accordance with launching program information;

an acquisition step of acquiring, from the external device via the communication unit, license information containing launching program information for specifying identification information of the image forming apparatus, the launching program module and count data for defining an executable count of the program module;

an updating step of updating, on the basis of the license information acquired in said acquisition step, the launching program information for specifying the launching program module; and a counting step of counting the number of images formed in correspondence with the program module, wherein in said updating step, the launching program information is updated on the basis of the license information, in a case where the number of formed images which are counted in said counting step and correspond to a launching program contained in the license information is not more than an upper limit value of the number of images contained in the license information, and wherein launching of the program module corresponding to the launching program defined by the license information is prohibited, in a case where a count in which the program module has been executed is not less than the executable count.

11. A computer-readable storage medium which stores a program for causing a computer to implement a program launching control method defined in claim 6.

12. An image forming system in which an information processing apparatus and an image forming apparatus are connected via a communication unit, the image forming apparatus comprising:

storage unit configured to store identification information for specifying the image forming apparatus;

program storage unit configured to store a plurality of program modules for realizing a plurality of functions of the image forming apparatus;

launching program identification unit configured to store launching program information for specifying a program module to be executed upon launching from the plurality of program modules stored in said program module stored in said program storage unit;

program management unit configured to execute a program module corresponding to the launching program information in a case where the image forming apparatus is activated on the basis of the launching program information stored in said launching program identification unit acquisition unit configured to acquire, from the information processing apparatus via the communication unit, license information containing launching program information for specifying identification information of the image forming apparatus, the launching program module and count data for defining an executable count of the program module; and updating unit configured to update the launching program information stored in said launching program identification unit, on the basis of the license information acquired by said acquisition unit, wherein launching of the program module corresponding to the launching program defined by the license information is prohibited, in a case where a count in which the program module has been executed is not less than the executable count, and wherein in a case where the identification information of the license information acquired by said acquisition unit coincides with the identification information stored in said storage unit, said updating unit updates, as the launching program information, identification information of the program module corresponding to the launching program information contained in the license information; and the information processing apparatus comprising:

license information storage unit configured to store the license information in correspondence with the identification information, and transmission unit configured to transmit the license information corresponding to the identification information of the image forming apparatus to the image forming apparatus on the basis of a request from the image forming apparatus.

* * * * *